(12) United States Patent
Herbert et al.

(10) Patent No.: US 8,576,032 B2
(45) Date of Patent: Nov. 5, 2013

(54) ELECTROMAGNETIC APPARATUS AND METHOD FOR CONTROLLING FLUID FLOW

(75) Inventors: Kay Herbert, Winthrop, MA (US); Natan E. Parsons, Brookline, MA (US); Xiaoxiong Mo, Lexington, MA (US); Fatih Guler, Winchester, MA (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 12/460,454

(22) Filed: Jul. 16, 2009

(65) Prior Publication Data

US 2010/0051841 A1 Mar. 4, 2010

Related U.S. Application Data

(63) Continuation of application No. 11/236,325, filed on Sep. 26, 2005, now abandoned, which is a continuation-in-part of application No. 10/421,359, filed on Apr. 23, 2003, now Pat. No. 6,948,697, which is a continuation of application No. PCT/US01/51098, filed on Oct. 25, 2001, which is a continuation-in-part of application No. 09/696,154, filed on Oct. 25, 2000, now Pat. No. 6,609,698, said application No. 11/236,325 is a continuation-in-part of application No. 10/610,954, filed on Jul. 1, 2003, now Pat. No. 6,955,334, which is a continuation of application No. 10/037,473, filed on Oct. 19, 2001, now abandoned, which is a continuation of application No. 09/514,491, filed on Feb. 29, 2000, now Pat. No. 6,305,662, and a continuation-in-part of application No. 09/924,130, filed on Aug. 7, 2001, now Pat. No. 6,450,478.

(60) Provisional application No. 60/659,343, filed on Mar. 5, 2005.

(51) Int. Cl.
*H01H 1/12* (2006.01)

(52) U.S. Cl.
USPC ............................ 335/220; 251/129.15

(58) Field of Classification Search
USPC ......... 335/220–229; 251/65, 129.01–129.022
See application file for complete search history.

(56) References Cited

U.S. PATENT DOCUMENTS

| 1,978,737 A | 10/1934 | Bower .......................... 361/154 |
| 2,413,622 A | 12/1946 | Harding, Jr. .................... 251/70 |

(Continued)

FOREIGN PATENT DOCUMENTS

| EP | 0 072 681 | 2/1983 |
| EP | 0 319 618 | 6/1989 |

(Continued)

OTHER PUBLICATIONS

Information Disclosure Statement issued in PCT Application PCT/US01/51098 on Aug. 13, 2002.

*Primary Examiner* — Bernard Rojas
(74) *Attorney, Agent, or Firm* — Ivan David Zitkovsky

(57) ABSTRACT

An actuator including actuator base, bobbin, and pole piece forming a pocket for a ferromagnetic armature located therein. The actuator including a radial magnet and a solenoid coil constructed and arranged to cause a linear displacement of the armature upon application of a coil drive current from a control circuit. The actuator may include a flexible membrane that partially encloses the armature to form an armature chamber filled with an incompressible fluid. In a valve design, a fluid flow is stopped by driving the membrane against a valve seat. Pressure from the controlled fluid in the conduit is transmitted through the membrane to the fluid within the armature chamber so that the armature does not need to counteract force applied to the membrane by the conduit fluid's pressure. A fluid flow is opened by driving the membrane away from the valve seat.

36 Claims, 14 Drawing Sheets

(56) References Cited

U.S. PATENT DOCUMENTS

| | | | | |
|---|---|---|---|---|
| 2,619,986 | A | 12/1952 | Goepfrich | 137/719 |
| 2,842,400 | A | 8/1958 | Booth et al. | 299/149 |
| 3,098,635 | A | 7/1963 | Delaporte et al. | 251/54 |
| 3,178,151 | A | 4/1965 | Caldwell | 251/129.1 |
| 3,369,205 | A | 2/1968 | Hamrick | 335/177 |
| 3,420,492 | A | 1/1969 | Ray | 251/129.17 |
| 3,606,241 | A | 9/1971 | Bornholdt | 251/52 |
| 3,740,019 | A | 6/1973 | Kessell et al. | 251/129 |
| 3,789,876 | A | 2/1974 | Kempton | 137/554 |
| 3,802,462 | A | 4/1974 | Trosch | 137/556 |
| 3,812,398 | A | 5/1974 | Kozel et al. | 251/331 |
| 3,814,376 | A | 6/1974 | Reinicke | 251/65 |
| 3,821,967 | A | 7/1974 | Sturman et al. | 137/624.15 |
| 4,010,769 | A | 3/1977 | De Lorenzo et al. | 137/312 |
| 4,097,786 | A | 6/1978 | Lund | 318/282 |
| 4,280,680 | A | 7/1981 | Payne | 251/175 |
| 4,304,391 | A | 12/1981 | Yamaguchi | 251/129 |
| 4,310,143 | A | 1/1982 | Determan | 251/30.02 |
| 4,383,234 | A | 5/1983 | Yatsushiro et al. | 335/253 |
| 4,470,030 | A * | 9/1984 | Myers | 335/228 |
| 4,486,728 | A | 12/1984 | Hastings et al. | 335/256 |
| 4,494,098 | A | 1/1985 | Haneda et al. | 335/230 |
| 4,505,451 | A | 3/1985 | Jonas | 251/285 |
| 4,514,710 | A | 4/1985 | Conrad | 335/230 |
| 4,597,895 | A | 7/1986 | Bartlett | 252/392 |
| 4,605,197 | A | 8/1986 | Casey et al. | 251/30.01 |
| 4,609,178 | A | 9/1986 | Baumann | 251/229 |
| 4,662,604 | A | 5/1987 | Cook | 251/129.17 |
| 4,682,135 | A | 7/1987 | Yamakawa | 335/256 |
| 4,707,867 | A | 11/1987 | Kawabe et al. | 251/129.11 |
| 4,742,583 | A | 5/1988 | Yoshida et al. | 4/313 |
| 4,746,093 | A | 5/1988 | Scanderbeg | 251/30.04 |
| 4,751,487 | A | 6/1988 | Green, Jr. | 335/234 |
| 4,794,890 | A | 1/1989 | Richeson, Jr. | 123/90.11 |
| 4,823,825 | A | 4/1989 | Buchi | 361/152 |
| 4,826,132 | A | 5/1989 | Moldenhauer | 251/129.17 |
| 4,829,947 | A | 5/1989 | Lequesne | 123/90.11 |
| 4,832,582 | A | 5/1989 | Buffet | 417/413 |
| 4,887,032 | A | 12/1989 | Hetrick | 324/296.16 |
| 4,894,698 | A | 1/1990 | Hijikigawa et al. | 257/254 |
| 4,910,487 | A | 3/1990 | Kleinhappl | 335/234 |
| 4,921,208 | A | 5/1990 | LaMarca | 251/30.04 |
| 4,932,430 | A | 6/1990 | Fernstrom | 137/85 |
| 4,944,487 | A | 7/1990 | Holtermann | 251/129.17 |
| 4,949,009 | A | 8/1990 | Iwamoto | 313/407 |
| 4,977,929 | A | 12/1990 | Chinnock et al. | 137/863 |
| 4,981,155 | A | 1/1991 | Pick et al. | 137/238 |
| 4,988,074 | A | 1/1991 | Najmolhoda | 251/129.08 |
| 5,016,681 | A | 5/1991 | Ghiardo | 139/452 |
| 5,032,812 | A | 7/1991 | Banick et al. | 335/17 |
| 5,063,955 | A * | 11/1991 | Sakakibara | 137/1 |
| 5,085,402 | A * | 2/1992 | O'Dell | 251/129.21 |
| 5,108,070 | A | 4/1992 | Tominaga | 251/65 |
| 5,109,885 | A | 5/1992 | Tauscher | 137/554 |
| 5,125,621 | A | 6/1992 | Parsons | 251/30.3 |
| 5,127,625 | A | 7/1992 | Kleinhappl | 251/129.17 |
| 5,166,652 | A | 11/1992 | Koyama et al. | 335/234 |
| 5,166,681 | A | 11/1992 | Bottesch et al. | 340/933 |
| 5,169,118 | A | 12/1992 | Whiteside | 251/30.03 |
| 5,188,337 | A | 2/1993 | Mertens et al. | 251/129.17 |
| 5,213,303 | A | 5/1993 | Walker | 251/30.02 |
| 5,249,603 | A * | 10/1993 | Byers, Jr. | 251/129.1 |
| 5,265,594 | A | 11/1993 | Olsson et al. | 138/204.18 |
| 5,265,843 | A | 11/1993 | Kleinhappl | 251/129.17 |
| 5,300,908 | A | 4/1994 | Stone et al. | 335/256 |
| 5,365,210 | A | 11/1994 | Hines | 335/238 |
| 5,375,811 | A | 12/1994 | Reinicke | 251/126.16 |
| 5,408,369 | A | 4/1995 | Miura et al. | 360/75 |
| 5,433,245 | A | 7/1995 | Prather et al. | 137/554 |
| 5,443,241 | A | 8/1995 | Odaira et al. | 251/129.07 |
| 5,474,303 | A | 12/1995 | Coles | 277/2 |
| 5,477,149 | A | 12/1995 | Spencer et al. | 137/554 |
| 5,481,187 | A | 1/1996 | Marcott et al. | 324/207.16 |
| 5,482,250 | A | 1/1996 | Kodaira | 251/129.04 |
| 5,574,617 | A | 11/1996 | Shimanuki et al. | 361/154 |
| 5,583,434 | A | 12/1996 | Moyers et al. | 324/207.16 |
| 5,584,465 | A | 12/1996 | Ochsenreiter | 251/65 |
| 5,600,237 | A | 2/1997 | Nippert | 324/207.16 |
| 5,603,483 | A | 2/1997 | Reuter et al. | 251/129.02 |
| 5,607,137 | A | 3/1997 | Kanda et al. | 251/129.07 |
| 5,636,601 | A | 6/1997 | Moriya et al. | 123/90.11 |
| 5,699,833 | A * | 12/1997 | Tsataros | 137/624.11 |
| 5,708,355 | A | 1/1998 | Schrey | 323/282 |
| 5,716,038 | A | 2/1998 | Scarffe | 251/30.03 |
| 5,747,684 | A | 5/1998 | Pace et al. | 73/119 A |
| 5,757,259 | A | 5/1998 | Fulford et al. | 336/92 |
| 5,785,955 | A | 7/1998 | Fischer | 424/49 |
| 5,787,915 | A | 8/1998 | Bryers et al. | 137/1 |
| 5,787,924 | A | 8/1998 | Cewers et al. | 251/129.04 |
| 5,797,360 | A | 8/1998 | Pischinger et al. | 123/90.11 |
| 5,804,962 | A | 9/1998 | Kather et al. | 324/207.16 |
| 5,808,534 | A | 9/1998 | Laffey | 335/250 |
| 5,815,362 | A | 9/1998 | Kahr et al. | 361/154 |
| 5,819,336 | A | 10/1998 | Gilliam et al. | 3/623 |
| 5,821,840 | A | 10/1998 | Ricker | 335/128 |
| 5,900,201 | A | 5/1999 | Chatterjee et al. | 264/109 |
| 5,905,625 | A | 5/1999 | Schebitz | 361/154 |
| 5,941,505 | A | 8/1999 | Nagel | 251/335.2 |
| 5,964,192 | A | 10/1999 | Ishii | 123/90.11 |
| 5,996,965 | A | 12/1999 | Eichholz et al. | 251/30.05 |
| 6,036,167 | A | 3/2000 | Wade | 251/30.04 |
| 6,044,814 | A | 4/2000 | Fuwa | 123/90.11 |
| 6,076,550 | A | 6/2000 | Hiraishi et al. | 137/550 |
| 6,155,231 | A | 12/2000 | Adachi et al. | 123/399 |
| 6,158,715 | A | 12/2000 | Kirschbaum | 251/129.06 |
| 6,178,956 | B1 | 1/2001 | Steinmann et al. | 123/568.21 |
| 6,265,956 | B1 | 7/2001 | Cascolan et al. | 335/234 |
| 6,293,516 | B1 | 9/2001 | Parsons et al. | 251/129.04 |
| 6,305,662 | B1 | 10/2001 | Parsons et al. | 251/129.04 |
| 6,450,478 | B2 | 9/2002 | Parsons et al. | 251/129.04 |
| 6,609,698 | B1 | 8/2003 | Parsons et al. | 251/129.17 |
| 6,932,316 | B2 | 8/2005 | Herbert et al. | 251/30.02 |
| 6,948,697 | B2 | 9/2005 | Herbert et al. | 251/129.04 |
| 6,955,334 | B2 | 10/2005 | Parsons et al. | 251/129.04 |
| 2003/0120157 | A1 * | 6/2003 | Fukui et al. | 600/484 |

FOREIGN PATENT DOCUMENTS

| | | |
|---|---|---|
| EP | 0 230 150 | 10/1990 |
| EP | 0401 468 | 12/1990 |
| EP | 0 663 552 | 7/1995 |
| EP | 0 762 025 | 3/1997 |
| EP | 0 942 214 | 9/1999 |
| FR | 2 590 088 | 5/1987 |
| JP | 07332534 | 12/1995 |
| JP | 2000266196 | 9/2000 |
| JP | 2000283322 | 10/2000 |
| JP | 2001050419 | 2/2001 |
| WO | WO 85/05657 | 12/1985 |
| WO | WO 88/01705 | 5/1988 |

* cited by examiner

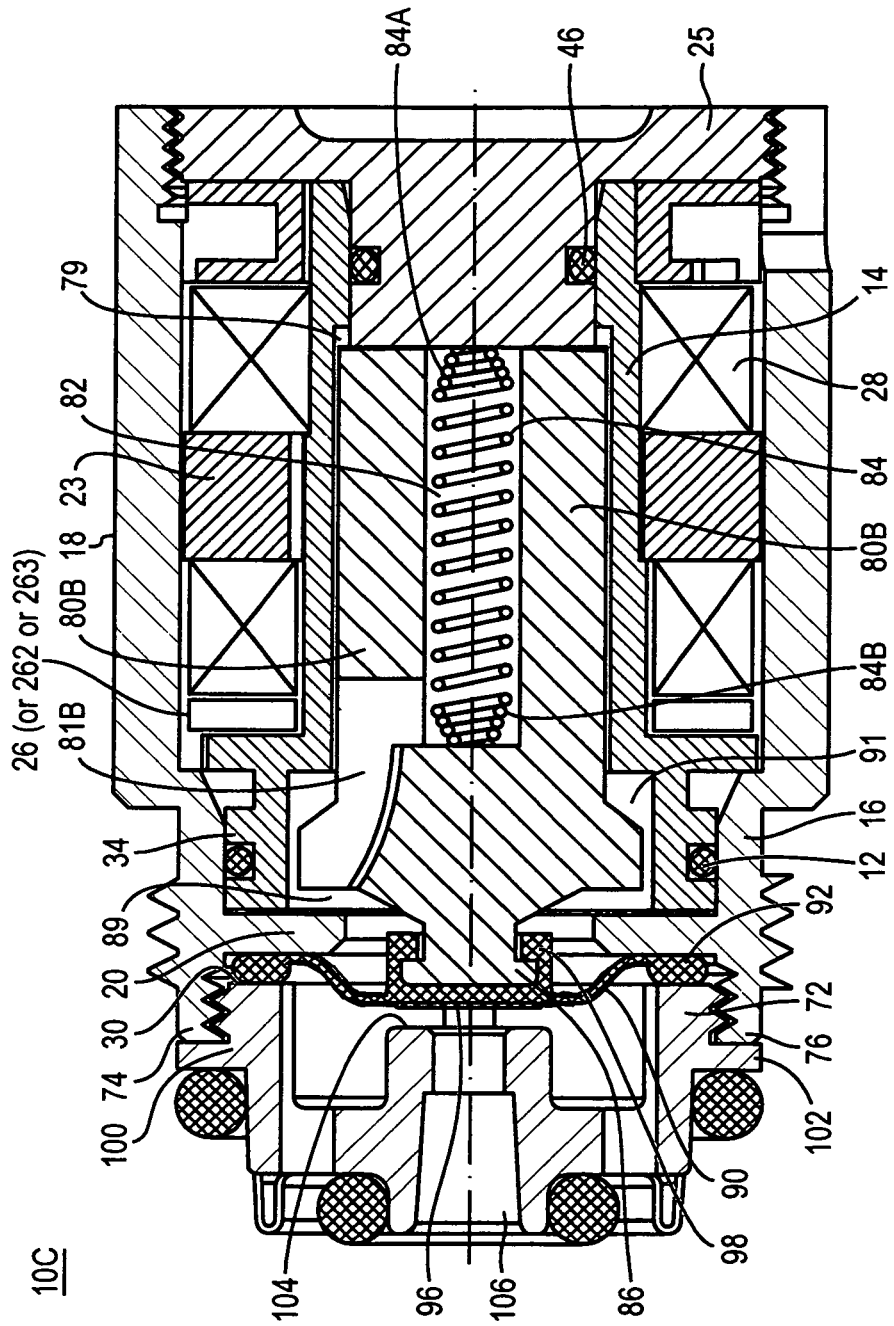

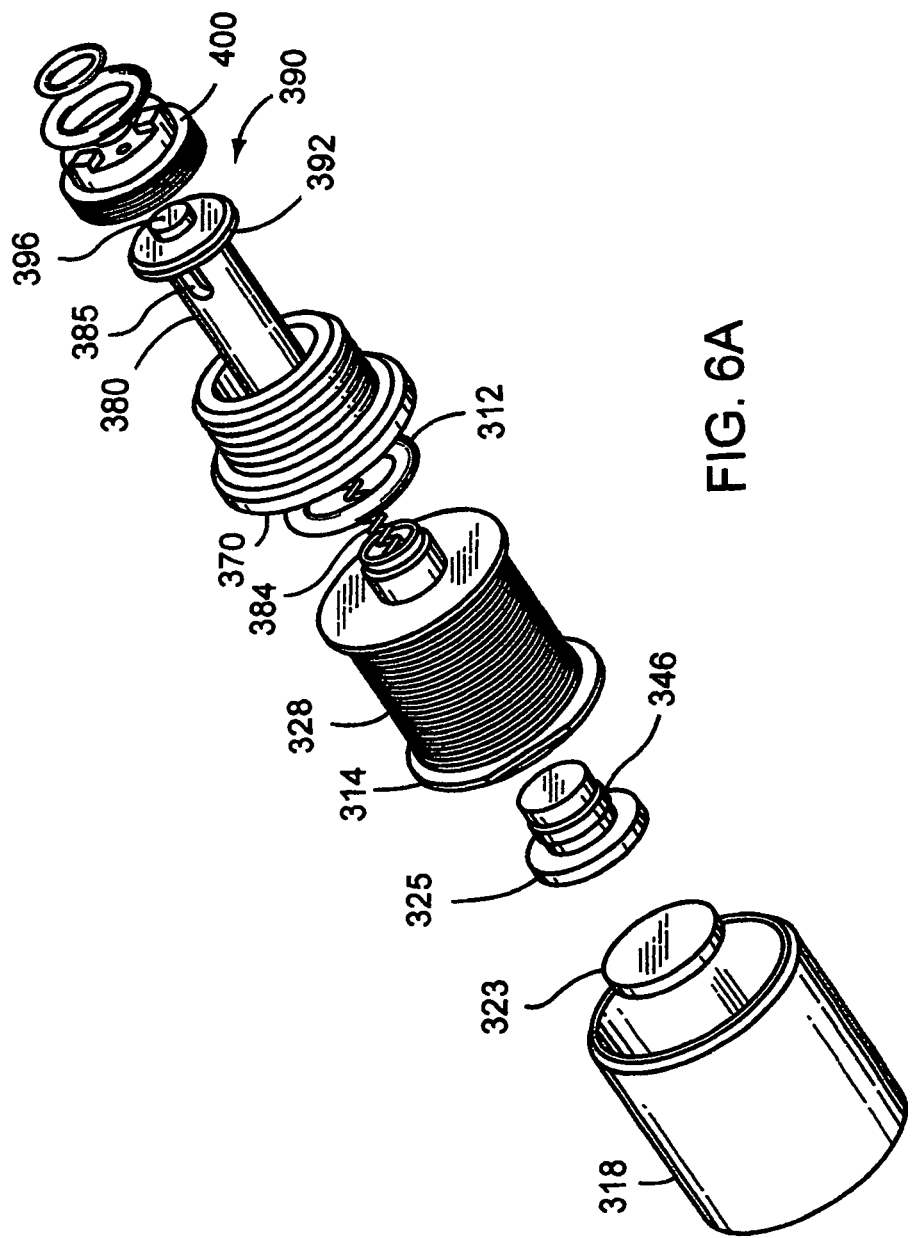

ELECTROMAGNETIC APPARATUS AND METHOD FOR CONTROLLING FLUID FLOW

This application is a continuation of U.S. application Ser. No. 11/236,325, filed on Sep. 26, 2005, now abandoned which claims priority from U.S. Provisional Application 60/659,343, filed on Mar. 5, 2005. This application is a continuation of U.S. application Ser. No. 11/236,325, which is a continuation-in-part of U.S. application Ser. No. 10/421,359, filed on Apr. 23, 2003, now U.S. Pat. No. 6,948,697, entitled "Apparatus and Method for Controlling Fluid Flow," which is a continuation of PCT Application PCT/US01/51098, filed on Oct. 25, 2001, which is continuation-in-part of U.S. application Ser. No. 09/696,154, filed on Oct. 25, 2000, now U.S. Pat. No. 6,609,698. The U.S. application Ser. No. 11/236,325 is also a continuation-in-part of U.S. application Ser. No. 10/610,954, filed on Jul. 1, 2003, now U.S. Pat. No. 6,955,334 which is a continuation of U.S. application Ser. No. 10/037,473, filed on Oct. 19, 2001 now abandoned which is a continuation of U.S. application Ser. No. 09/514,491, filed on Feb. 29, 2000, now U.S. Pat. No. 6,305,662, and is a continuation-in-part of U.S. application Ser. No. 09/924,130, filed on Aug. 7, 2001, now U.S. Pat. No. 6,450,478. The disclosure of all of the above-mentioned applications is considered part of, and is incorporated by reference in, the disclosure of this application.

FIELD OF THE INVENTION

The present invention relates to controlling fluid flow in various systems and more specifically to electromagnetic actuators.

BACKGROUND INFORMATION

Industrial, agricultural and household systems use various types of valves for controlling fluid flow. The most common form of electrically operated valve employs a solenoid wound onto a bobbin, and a valve member located inside the bobbin and driven by a drive current passed through the solenoid. In a closed position, a tip of the valve member (armature) is pressed against a valve seat and thereby stops flow through a conduit in which the valve seat is disposed. Although the tip of the valve member is in many cases made of a synthetic resin, or other resilient material, other parts of the valve member are made up of a material having relatively high magnetic permeability, such as steel, so that it will be subject to force from the solenoid's magnetic field and will act as a solenoid armature.

In battery-operated actuators, electric valve-control circuitry should employ as little power as possible. To achieve highly energy efficient operation, the valve member (i.e., the solenoid's armature) needs to be as magnetically permeable as possible. Furthermore, the electric-valve control circuitry should apply only the minimum drive current necessary for the minimum duration during the armature activation for latching valves (i.e., valves whose actuators require power to open or close the valve but not to keep it opened or closed). In non-latching actuators, unnecessarily high drive current for holding the valve open also may needlessly reduce the battery's longevity. Therefore, the reduction of energy consumption is an important aspect of actuator design.

In many prior art actuators, water (or other fluid being regulated) can flow into the cavity of the bobbin containing the actuator. The actuator frequently includes a flow passage in communication with an internal void (i.e., armature chamber) to provide a low-flow resistance path and to compensate for the external pressure on the valve member (i.e., the pressure exerted by the regulated fluid onto the armature). Thus, the regulated fluid moves back and forth in response to closing or opening the actuator. This usually causes degradation of the armature (i.e., corrosion) and problems with metal and other ions (or other deposits) that accumulate within the bobbin's cavity. The severity of this problem depends on the type of fluid being regulated.

As mentioned above, an optimal armature of the solenoid has as high a magnetic permeability as possible. However, materials with very high magnetic permeability usually have low corrosion resistance. Thus, designers in the past have had to compromise permeability for corrosion resistance. For example, carbon steel has a high magnetic permeability, but is quite vulnerable to rust and corrosion. Therefore, designers have resorted to the higher magnetic permeability grades of stainless steel, even though stainless steel is less magnetically permeable than carbon steel. Still, designers have had problems with the above-described deposits, or conversely, problems with preventing fluid contamination of the armature, bobbin or other valve elements. Hence, the need for an improved valve actuator.

SUMMARY OF THE INVENTION

The present invention relates to an apparatus and method for controlling fluid flow in various systems.

According to one aspect, an electromagnetic actuator includes a solenoid coil and an armature housing constructed and arranged to receive in an armature chamber a movable armature including a distal part. The actuator also includes a control circuit constructed to apply a coil drive current to the solenoid coil and thereby cause a linear displacement of the distal part with respect to a valve passage controlled by the actuator. The actuator also includes a radial magnet arranged to maintain the armature in a stationary position by a force of a magnetic field without application of said coil drive current.

According to another aspect, an electromagnetic actuator includes a solenoid coil, and an armature housing constructed and arranged to form an armature pocket (or chamber) formed to receive a ferromagnetic armature, including a distal part of the armature (or a plunger tip). The actuator also includes a membrane secured with respect to the pocket and arranged to enclose at least partially the distal tip to seal armature fluid within the pocket, wherein displacement of the armature displaces the membrane with respect to a valve passage controlled by the actuator.

According to another aspect, the invention incorporates an electromagnetic actuator that includes a solenoid coil, a permanent magnet, and an armature housing that forms an armature chamber within which a ferromagnetic armature is found.

According to yet another aspect, the invention is an electromagnetic actuator comprising a solenoid coil, an armature housing, a radial magnet and a ferromagnetic armature inside an armature chamber. The electromagnetic actuator also includes a membrane arranged to at least partially enclose a distal part of the armature to seal armature fluid inside the armature chamber. A linear displacement of the armature, caused by a coil drive current applied to the solenoid coil, displaces the distal part and thus the membrane with respect to a valve passage controlled by the actuator. The radial magnet is magnetically coupled to a magnetic circuit arranged to maintain the ferromagnetic armature in a selected position.

The actuator may include an armature sensor. The armature sensor may be a piezoelectric transducer. The piezoelectric transducer may be secured to an external housing of the actuator. Alternatively, the armature sensor includes an optical sensor, or a detector of electromagnetic radiation. The detector of electromagnetic radiation may include a wire loop.

According to yet another aspect, an electromagnetic actuator system includes a solenoid coil and an armature housing constructed and arranged to receive in an armature chamber a movable armature including a distal part. The actuator system also includes a control circuit constructed to apply a coil drive current to the solenoid coil and thereby cause a linear displacement of the distal part with respect to a valve passage controlled by the actuator. The actuator system also includes a radial magnet arranged to maintain the armature in a stationary position by a force of a magnetic field without application of the coil drive current.

Preferably, the distal part of the armature may be arranged to compress a pliable member against a valve seat when closing the valve passage while the armature is disposed in its extended armature position. The actuator may include an armature sensor constructed to detect displacement of the armature. The control circuit may be powered by a battery. The control circuit may be operatively connected to an external object sensor. The object sensor may include a motion sensor or a presence sensor. The object sensor may include an active optical sensor, or a passive optical sensor, or an ultrasonic sensor or a capacitive sensor.

The above actuators are operable by driving electric current through the solenoid coil to drive the armature between retracted and extended armature positions. The actuator may include a flexible membrane secured at the mouth of the pocket so as to deform outward when the armature travels to its extended position. The membrane helps form, with the housing, a substantially fluid-tight armature chamber that contains the armature. The radial magnet may include a single ring-like member, or may include two or more semicircular members assembled to form a ring, or may include several discrete magnets located within the armature housing.

If the membrane is used, a substantially incompressible fluid occupies the entire chamber volume not occupied by the armature. The chamber fluid may include incompressible fluid comprising a corrosion inhibitor. The incompressible fluid may consist essentially of water mixed with a corrosion inhibitor. The incompressible fluid may include a liquid having relatively large molecules.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule. The armature liquid may in general be any substantially non-compressible liquid having low viscosity and non-corrosive properties with respect to the armature. Because of this protection, the illustrated embodiment's armature material can be a low-carbon steel; corrosion resistance is not as big a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as, say, a flexible tip, that are not ferromagnetic.

According to yet another aspect, an actuator system includes an actuator including an actuator housing, an armature located within an armature chamber a radial magnet, an armature sensor and a coil operable by application of a coil drive provided from a control circuit. The control circuit is constructed to provide the coil drive in the first drive direction to conduct current in a first current direction intended to drive the armature to a first end position. The control circuit is constructed to begin applying coil drive to a coil in the first direction and to be responsive to the sensor output meeting a predetermined first current-termination criterion to stop applying this coil drive to the coil in the first drive direction.

This use of the armature sensor reduces the energy waste that usually occurs in driving the actuator's armature. An armature sensor may monitor the armature movement or determine when the armature has reached the end of its travel. At a selected point, based on the signal from the armature sensor, a drive signal to the actuator coil drive ends. This can reduce energy consumption greatly, because coil-drive duration does not always need to be long enough to meet worst-case requirements, which are usually applied to assure opening or closing when there is no armature sensor. This reduction of energy use results in a significant battery-longevity increase. Further, a sensor can check if the actuator is functioning properly, and aid in monitoring the condition of the actuator in question. These measurements show the state of the condition of the valve. Once the armature reaches the end position and makes a sound, for example, the sensor generates a sensor output indicative of the sound sensed. The sound sensor may be such as described in U.S. Pat. Nos. 6,450,478; 6,305,662; 6,293,516, which are incorporated by reference. Other signals indicative of the armature position may be used.

Advantageously, the use of the membrane enables the use of armature materials with a high magnetic permeability such as the ferromagnetic types of carbon steel or stainless steel regardless of their low corrosion resistance, and the armature does not need to be subjected to a number of treatment steps to afford an acceptable level of corrosion resistance. Furthermore, the present design reduces the solenoid-wire size currently required because of a regular armature's non-optimal magnetic permeability. When the actuator includes a flexible membrane secured over the end of the pocket in which the armature travels, the armature's high-permeability material is not exposed to the possibly corrosive fluid whose flow the valve is to control. The armature pocket is filled with an incompressible fluid so as to counterbalance the force exerted by the controlled fluid's pressure. The flexible membrane also protects the valve assembly from contaminants present in the fluids flowing in and controlled by the valve assembly.

BRIEF DESCRIPTION OF THE DRAWING

FIG. 4A is a cross-sectional view of a third embodiment of the electromagnetic actuator.

FIG. 6A is an exploded view of the actuator shown in FIG. 6.

DETAILED DESCRIPTION OF ILLUSTRATIVE EMBODIMENTS

Figure 1:
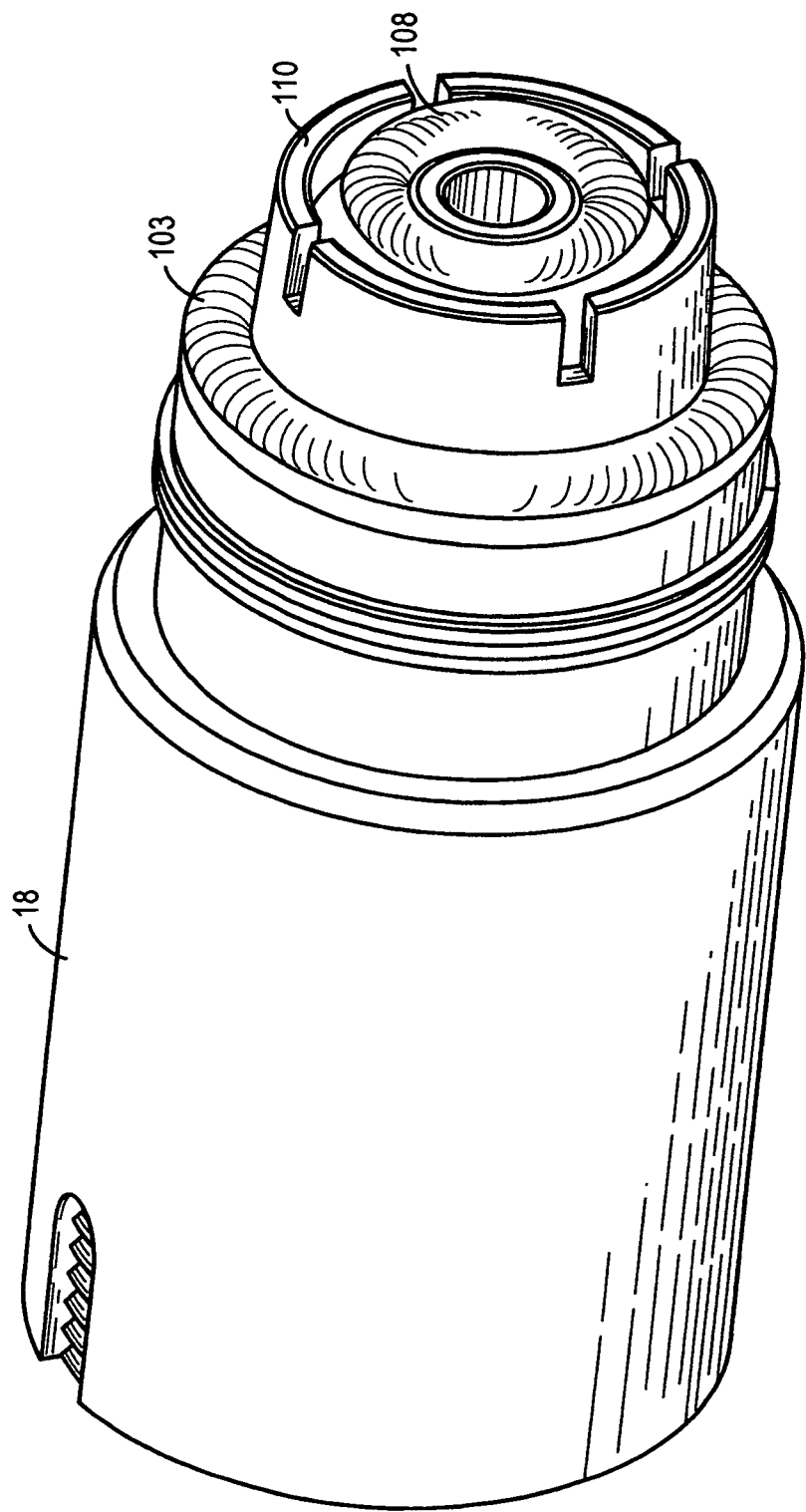
FIG. 1 is a perspective view of an electromagnetic actuator constructed and arranged for controlling fluid flow through a valve.

Industrial, agricultural and household systems use various types of valves that use electromagnetic actuators for controlling fluid flow. Referring to FIG. 1, an electrically operable valve 10A uses force from magnetic fields and the biasing force of a radial magnet to drive an armature within an actuator into a valve seat, thereby stopping flow through a conduit, and to move the armature away from the valve seat, thereby opening the valve once more.

Figure 2:
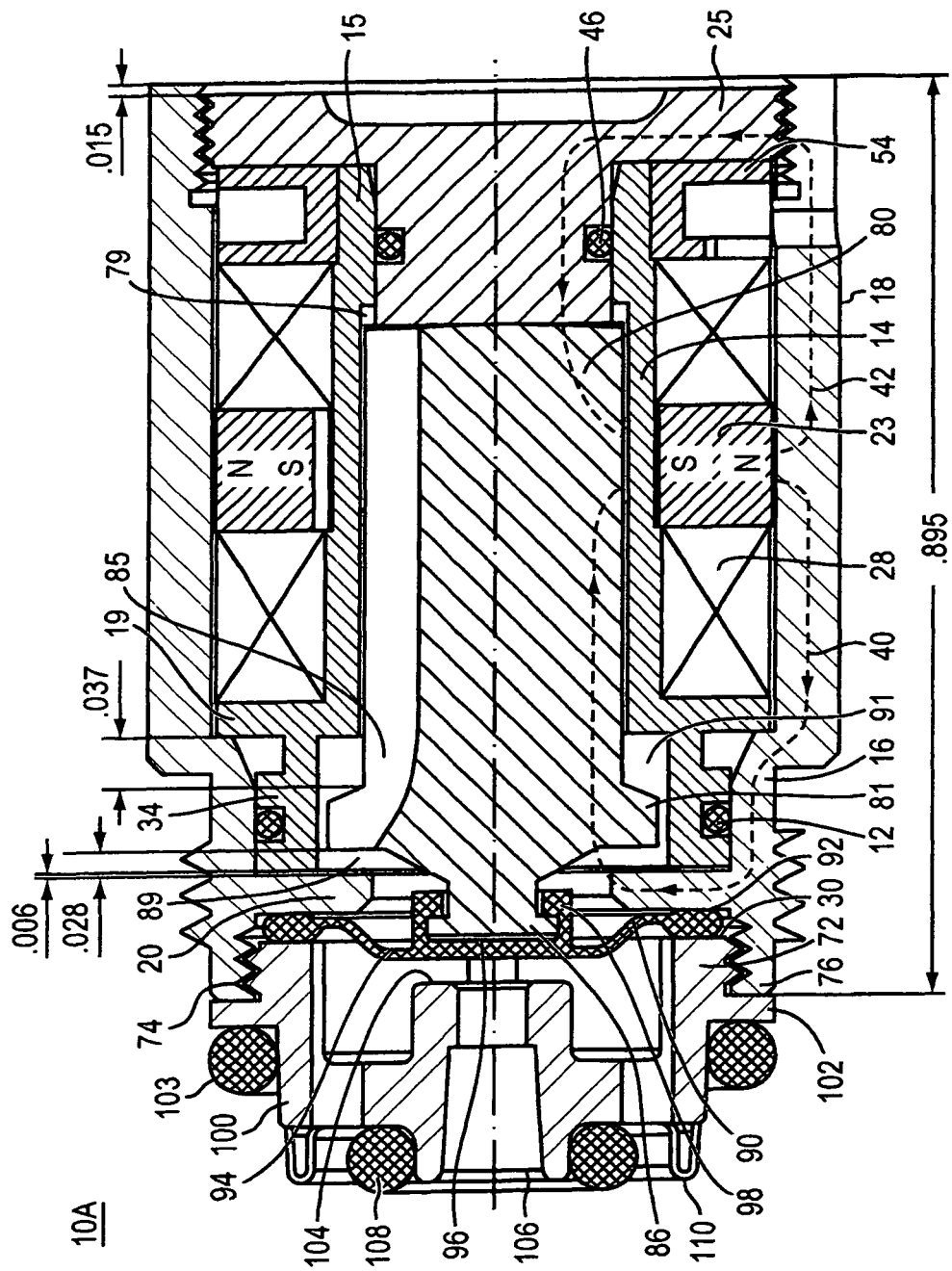
FIG. 2 is a cross-sectional view of the electromagnetic actuator of FIG. 1 including the valve.

FIGS. 1 and 2 illustrate an embodiment of the electrically operable valve 10A. As seen in FIG. 2, the valve actuator 10A includes an annular magnet 23, a rear pole piece 25, a ferromagnetic armature 80, and the solenoid windings 28 wound about a solenoid bobbin 14. The valve also includes a resilient membrane 90 and a replaceable pilot body member 100, which defines the valve geometry. Resilient membrane 90 includes a thickened peripheral rim 92, flexible portion 94, portion 98, surrounding the plunger tip, and deformable sealing part 96.

Actuator 10A includes ferromagnetic armature 80 linearly and slideably movable in an armature pocket formed between rear pole piece 25, solenoid bobbin 14, and actuator housing 18 (i.e., actuator body 18). Housing 18 includes an actuator base 16, a shelf (i.e., flange) 20, and rear chamber 79. The entire armature 80 is surrounded by a non-corrosive, incompressible fluid located in the armature chamber (i.e., armature pocket). Valve 10A includes a resiliently deformable O-ring 12 that forms a seal between bobbin 14 and the solenoid housing 18, all of which are held together within housing 18. Actuator housing 18 is closed at actuator base 16 via pole piece 25 pressing against bobbin 14 at rear end 15, thereby securing windings 28 and magnet 23 within housing 18.

Referring still to FIG. 2, the outer surface of pilot body member 100, by its outer threads 72, engages complementary threads 74 provided at front base 76. An annular surface formed by flange 20 in base 16's lower part squeezes peripheral rim 92 of resiliently deformable membrane 90 against shoulder 30 formed by the rear surface of pilot body member 100.

Radial magnet 23 has its south pole facing inward, and its north pole facing outward. The magnet is annular to prevent the armature's attraction to one side or another of the bobbin, therefore keeping it centered within the bobbin so it can move smoothly.

Given the magnet's force, the armature tip (plunger tip 86) sits on the valve seat 104, closing conduit 106 and stopping flow through the conduit. Therefore, in the absence of a solenoid current, armature 80 tends to seek the leftward, extended position, and the valve is closed.

This force can be compensated for, and the valve opened, by running current through coil 28 so that the force of the magnetic field of magnet 23 is overcome by the magnetic force from coils 28. To close the valve, the drive voltage's polarity is applied such that the resultant magnetic flux from coils 28 has the same orientation as that of permanent magnet 23. This causes magnet 23's hold on armature 80 once more and urges plunger tip 86 together with membrane portion 98 onto valve seat 104. In the extended position of armature 80, the force of permanent magnet 23 is great enough to hold armature 80 without applying any "hold" drive current. Once the valve has thus closed, the return spring and magnet 23 keep it closed.

Other versions of valve 10A's actuator are possible in which the magnetic field faces in the opposite direction, causing the armature to remain open, and current is applied to coil 28 so that armature 80 continues to be held in the downward position, and the valve is closed. Once the valve is desired open, current is applied in the opposite direction to reinforce the magnetic field, and armature 80 sits in the retracted position once again due to the magnetic field of magnet 23.

Resiliently deformable O-ring 12 forms a seal between solenoid bobbin 14 and housing 18. This creates a fluid-tight seal, so that membrane 90 protects armature 80 from exposure to fluid flowing through fluid conduit 106 in pilot member 100. Membrane 90 also cooperates with an O-ring seal 46 (at pole piece 25) to form a fluid-tight armature chamber (including chambers 79, 91 and 89) filled with a chamber fluid (i.e., liquid or gas) that preferably is relatively inviscid, incompressible and non-corrosive. The liquid should have a large molecule, so that it is less predisposed to diffuse through membrane 90.

Resilient membrane 90 encloses the armature fluid located within the fluid-tight armature chamber. Resilient membrane 90 is exposed to the pressure of the regulated fluid in conduit 106 and may therefore be subject to considerable external force. However, in the closed state, armature 80 does not have to overcome this force, because conduit 106's pressure is transmitted through membrane 90 to the incompressible armature fluid within the armature chamber (i.e., armature pocket). The force that results from the pressure within the armature chamber therefore approximately balances the force that the external conduit pressure exerts.

In the illustrated embodiment, armature 80's leftmost end forms a narrowed tip portion 86 (i.e., plunger tip 86) having a surface that touches membrane 90, which in turn comes in contact with seat 104 to close conduit 106 to fluid movement. Plunger tip 86 may have a circular, elliptical, rectangular or other cross-section. Plunger tip 86's surface is related to the seat opening area, both of which can be increased or decreased. The plunger surface and the seat 104's surface can be optimized for a pressure range at which the valve actuator is designed to operate. Reducing the plunger surface (i.e., narrowing tip portion 86) reduces the plunger area involved in squeezing membrane 90 against seat 104, and this in turn reduces the force required to counter a given upstream fluid-conduit pressure. On the other hand, making the plunger tip area too small tends to damage membrane 90 during valve closing over time. An optimum range of tip-contact area to seat-opening area is between 1.4 and 12.3. The present actuator is suitable for a variety of pressures of the controlled fluid, including pressures of about 150 psi. Without any substantial modification, the valve actuator may be used in the range of about 30 psi to 80 psi, or even water pressures of about 125 psi.

Furthermore, flexible membrane 90 protects armature 80 located within an armature cavity that is filled with a sufficiently non-corrosive liquid, and this, in turn, enables actuator designers to make more favorable choices between materials with high corrosion resistance and high magnetic permeability. The entire armature 80 is surrounded by the armature liquid that has substantially equilibrated pressure being applied to the plunger surface (i.e., armature 80 substantially "floats" in the liquid in the armature chamber). Furthermore, membrane 90 provides a barrier to metal ions and other debris that would tend to migrate into the cavity from the fluid whose flow is being controlled, which is advantageous, especially if such debris is made of a magnetic material.

Referring still to FIG. 2, chamber 91 is in communication with a passage 85 on armature 80's body. Armature 80 is free to move with respect to fluid pressures within chamber 91 between the retracted and extended positions. Fluid passage 85 enables the force-balancing fluid displaced from the armature chamber's front well 89 through passage 85, to armature chamber's rear well 79, from which the armature's rear end has been withdrawn upon actuation. Although armature fluid can also flow around the armature's perimeter, arrangements in which rapid armature motion is required need a relatively low-flow resistance path such as the one that passage 85 helps form. Similar considerations favor use of a chamber liquid that has a relatively low viscosity.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule to prevent leakage. The chamber liquid may in general be any substantially incompressible liquid having low viscosity and non-corrosive properties with respect to the armature. Because of this corrosion protection, the illustrated embodiment's plunger material can be made from low-carbon steel, or other materials susceptible to corrosion. Other embodiments may employ materials such as the 420 or 430 series stainless steels. It is only necessary that the armature consist essentially of a ferromagnetic material, i.e., a material that the solenoid and magnet can attract. Even so, it may include parts, such as, say, a flexible tip, that are not ferromagnetic.

As referred to earlier, the narrowed base extension of pilot body member 100 includes external threads 72. The housing's internal threads 74 are made to fit the complementary external threads 72 of pilot body member 100. Actuator housing base 16 includes shelf 20 in contact with bobbin 14. Shelf 20 engages resiliently deformable membrane 90, pressing down its outer ring 92 and holding it in place.

Resiliently deformable membrane 90 includes outer ring 92, a compliant region 94, resilient region 96, and a C-shaped region 98 cupping plunger tip 86. In general, deformable membrane 90 and region 98 may have various shapes and sizes, depending on the arrangement and size of pilot body member 100 and armature 80's plunger tip 86.

Deformable membrane 90 is made of a durable material and may at least partially be made of an elastic material. Membrane 90 may be an EPDM diaphragm or another type of diaphragm. Furthermore, the material of deformable membrane 90 is selected to resist possible degradation caused by fluid regulated by valve 10A. Therefore, the same valve actuator can be fabricated for various industrial, agricultural, or other applications, with only deformable membrane 90 and pilot body member 100 specifically designed for the regulated fluid. In medical applications, membrane 90 and pilot member 100 (including O-rings 103 and 108) may be made of material resilient to sterilization, or may be made of a disposable material. Therefore, the valve actuator may be reused after being sterilized, or with new disposable elements.

Figure 4:
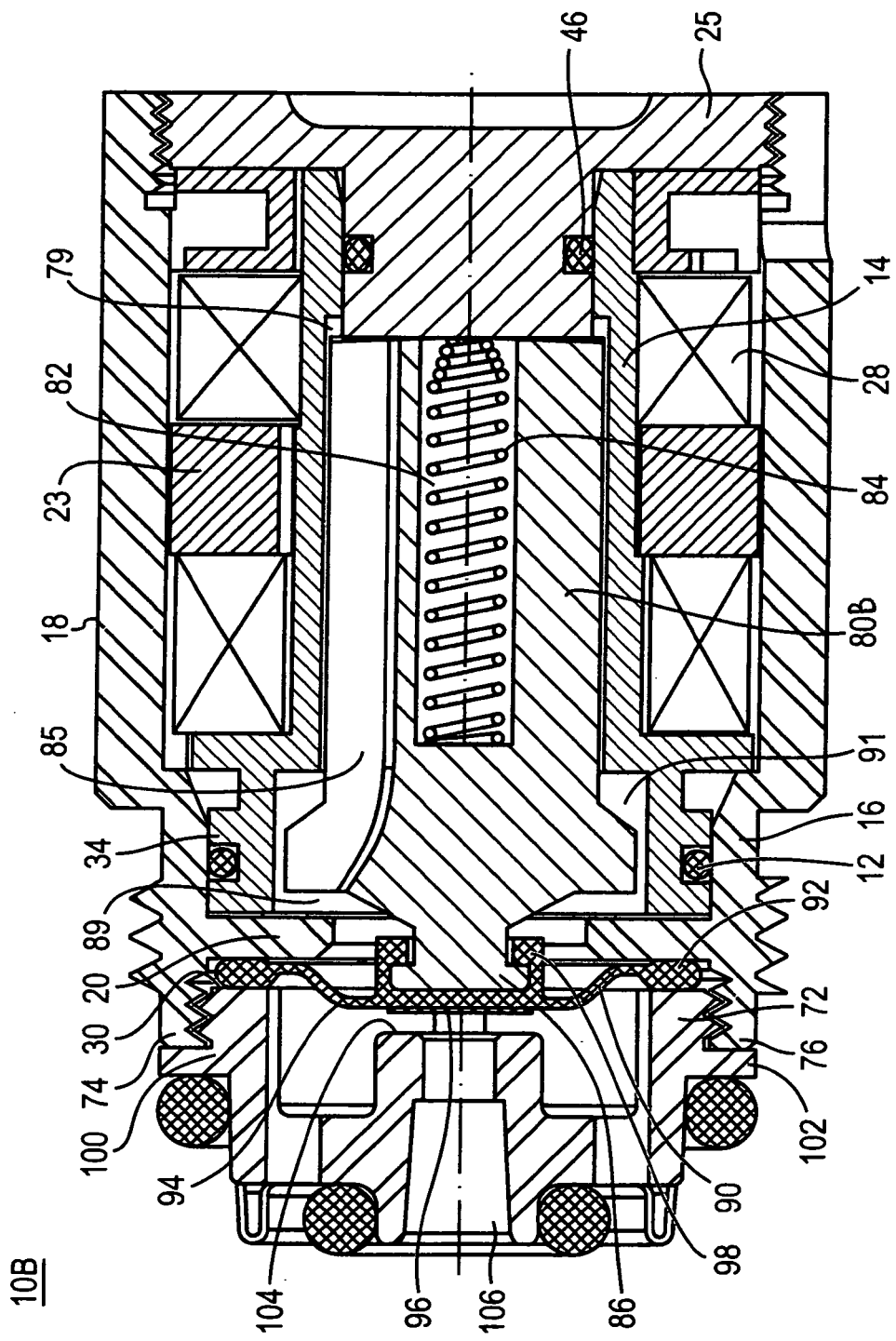
FIG. 4 is a cross-sectional view of a second embodiment of the electromagnetic actuator.

Referring to FIGS. 2, 4 and 4A, passage 85 located in ferromagnetic armature 80, 80A or 80B enables fluid movement in the armature chamber sealed by O-ring seals 12 and 46, and membrane 90. This fluid-tight seal for the chamber liquid protects the armature from exposure to the external fluid located in contact with pilot body member 100. Passage 85 may be in form of a slot extending along the entire length of armature 80. The low-resistance path enables a rapid linear movement of armature 80.

In general, during field maintenance or replacement, the valve actuator or other elements may be removed or replaced, which may cause a change in the distance and geometry between valve seat 104 and the plunger tip 86 (or resilient region 96) of the valve actuator. Furthermore, various piece-part tolerances and O-ring deformability may result in some variability in the position of the pilot body's conduit 106 with respect to C-shaped region 98 of membrane 90. This variability can cause resultant inconsistency in the valve operation during the open and close times, but such problems are eliminated by the use of pilot body member 100.

The actuator assembly includes pilot body member 100 reproducibly secured to the operator assembly, which provides numerous advantages: Specifically, pilot body member 100 includes external threads 72, which engage complementary threads 74, and therefore a flange 102. (Alternatively, actuator housing base 76 and pilot body member 100 may be connected by other types of locking mechanisms.) Importantly, flange 102 butts against a shoulder portion 76 of housing 18, thereby providing a positive stop to housing 18 when it is screwed onto the operator assembly. This positive stop provides a known, substantially constant distance and geometry between an external surface of resilient portion 96 and valve seat 104. The known, substantially constant distance and geometry, in turn, assures reproducible closing and opening action of the valve member.

The use of different pilot members 100 enables controlled changes (design changes) in the pilot-valve, seat spacing, and geometry when different pilot members 100 are pre-assembled onto the valve operator, as shown in FIG. 2. Finally, pilot body members 100 are used.

In the closed position, region 96 seals the opening at valve seat 104, and thus prevents fluid flow from a pilot passage 105 to a pilot passage 106. Pilot body member 100 may be coupled via pilot passages 105 and 106 to the pilot chamber of a diaphragm that controls a toilet flusher or a faucet. Thus, the use of pilot body member 100 is a novel improvement of the operation of diaphragm-controlled flush valves, such as those disclosed in U.S. Pat. Nos. 5,125,621; 5,195,720; 5,196,118; 5,244,179; or U.S. Patent Publication US2004/0164261, all of which are incorporated by reference. Furthermore, several diaphragms may be cascaded together, wherein passages 105 and 106 are connected to a first, smaller diaphragm, which in turn controls a second larger diaphragm that enables flow of a large amount of fluid to pass the diaphragm in its open state. These two diaphragms linked together create an amplification effect for effectively controlling fluid flow at large diaphragms or large fluid pressures.

Figure 3:
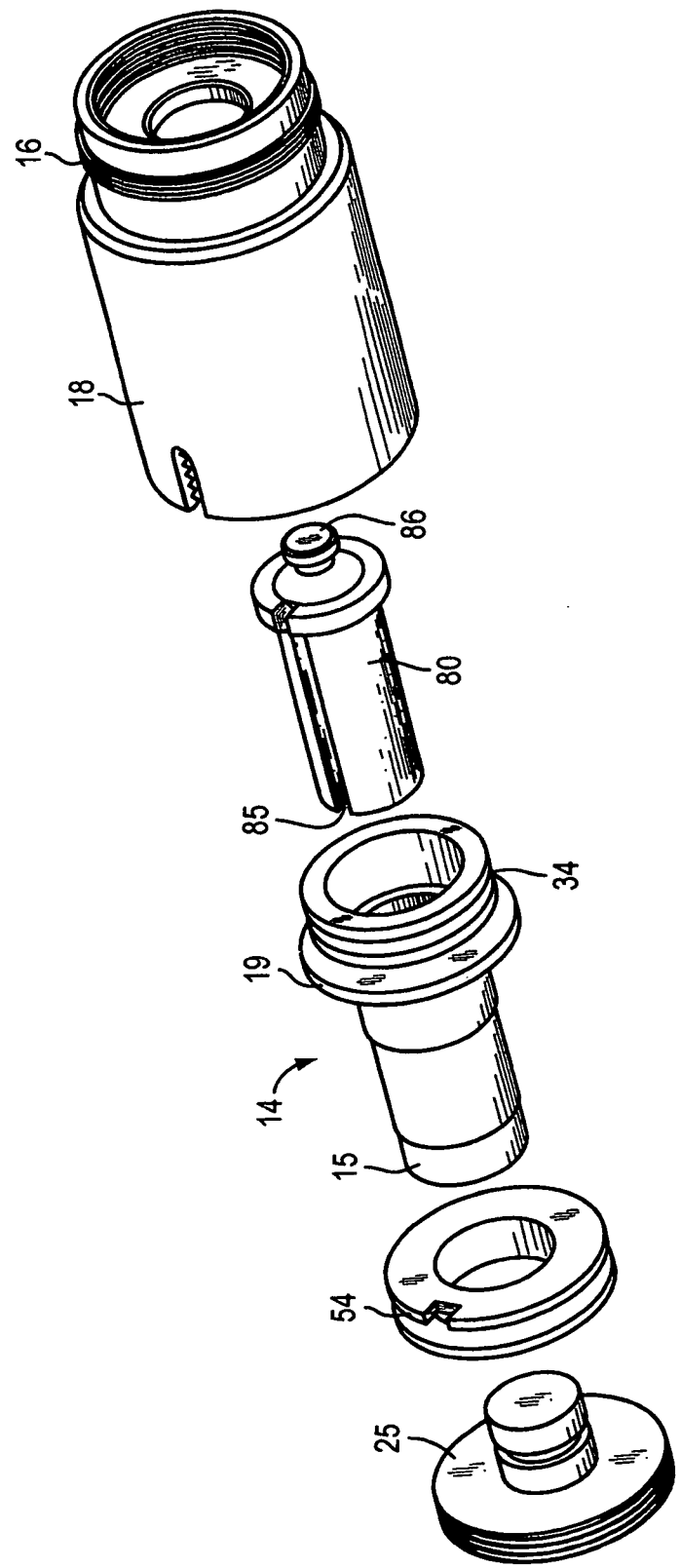
FIG. 3 is an exploded view of the electromagnetic actuator for controlling a valve.

FIG. 3 is an exploded view of different portions of the electromagnetic actuator 10A. The dimensions of all of the components of actuator 10A are shown in FIGS. 3A-F found in application 60/659,343, which is incorporated by reference for all purposes.

FIG. 4 illustrates another embodiment of an electromagnetic valve. Valve 10B also has a pilot body member 100 and resilient membrane 90. Valve 10B's actuator is composed of an armature 80A housed in the armature cavity defined by bobbin 14, pole piece 25, and membrane 90. This actuator also includes solenoid windings 28 wound about solenoid bobbin 14. Housing 18 has a base 16 to hold pole piece 25 against bobbin 14 and thereby secure windings 28 and magnet 23 together. Armature 80A is also slideably mounted in the armature chamber, and is surrounded by non-corrosive, low viscosity armature fluid. Again, pilot body member 100 is attached by threading it onto actuator body 18. Armature 80A also has a tip (plunger tip 86) that may have a circular, elliptical, rectangular or other cross-section, such as in valve 10A. In an optional embodiment, actuator armature 80A also includes a spring cavity 82 arranged to receive an optional spring 84, having tapered end portions 84A and 84B. The tapered spring ends enable machine sorting and assembly. Spring 84 is usually not needed since the magnetic circuit provides sufficient force for bistable operation of the solenoid (i.e. a latching actuator) without any drive current in any of the hold positions.

Pole piece 25 can be unscrewed with respect to housing 18 (actuator body 18), which changes its location with respect to magnet 23. This translation changes the reluctance in the above-described magnetic circuit, which extends through housing 18, thereby manually changing the plunger displacement properties due to the magnetic field. The adjustment of pole piece 25 may be used to optimize the magnetic circuit. This magnetic circuit provides for the bistable arrangement of the solenoid (i.e. a latching actuator). The use of spring 84 is optional, and is mainly used against high external pressures, for example, in direct valve arrangement (i.e., passage 106 is connected to fluid input).

FIG. 4A illustrates yet another embodiment of an electromagnetic valve very similar to that in FIG. 4. Valve 10C includes a pilot body member 100, and an armature 80B housed in the armature cavity defined by bobbin 14 and pole piece 25. Valve 10C also has a resilient membrane 90, to prevent the controlled fluid from flowing into the armature chamber and hold the chamber liquid in the cavity holding armature 80B. Actuator 10C also includes solenoid windings 28 wound about solenoid bobbin 14. Housing 18 is shaped in the same way as described above, to hold pole piece 25 against bobbin 14, and secure windings 28 and magnet 23 together. Armature 80B is also slideably mounted in the armature chamber, and pilot body member 100 is attached by threading it onto actuator body 18. Actuator armature 80B also includes spring cavity 82 and spring 84. Spring 84 in this case also includes the tapered ends, 84A and B, which enable machine sorting and assembly. Armature 80A does not include a passage 85, extending length-wise down armature 80A. However, armature 80A includes a passage 81B, which leads into the spring cavity. Passage 81B thus provides a low-resistance path for the chamber fluid, so that the liquid surrounding armature 80A can easily move into the cavity, and thus enabling a rapid back-and-forth linear movement of armature 80A. In the absence of passage 85, the presence of a passage 81B leading into spring cavity 82, alone enables rapid back-and-forth movement of armature 80A due to its providing a low-resistance path for the chamber fluid to move within cavities 79, 91, 89 and 82. However, both passages could be included in an armature for the actuator, to allow free motion of the chamber liquid.

Armature 80B includes a plunger tip 86 that may have a circular, elliptical, rectangular or other cross-section, such as in valve actuator 10A or 10B. Valve 10C also includes a valve sensor 26 (262 or 263), which can detect the position of the armature to ascertain the response of the valve for the purposes of controlling it and assessing its performance; see FIG. 5.

Figure 4B:
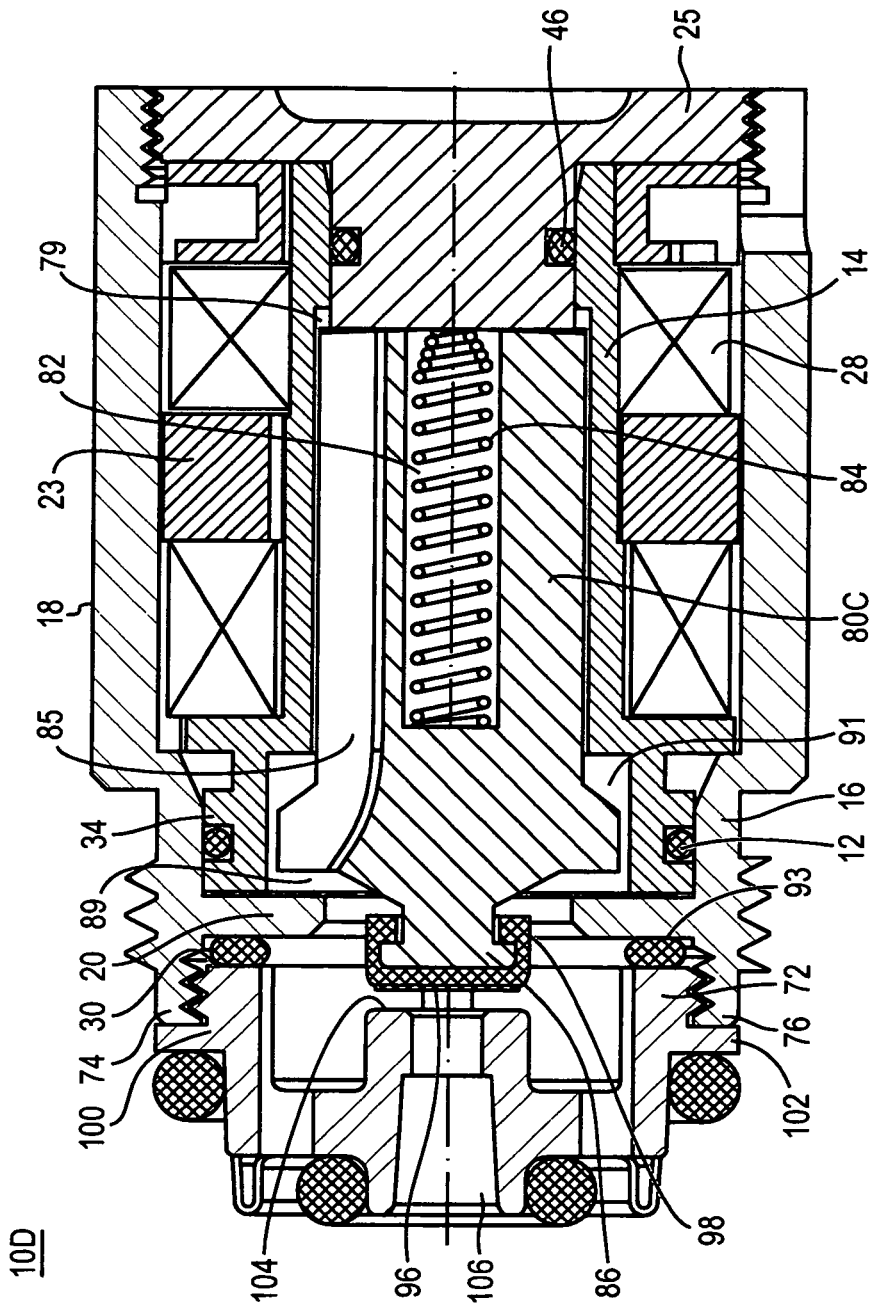
FIG. 4B is a cross-sectional view of a fourth embodiment of the electromagnetic actuator

FIG. 4B illustrates another embodiment of an electromagnetic valve, 10D. Valve 10D also includes a pilot body member 100, an armature 80C housed in the armature cavity as defined by bobbin 14 and pole piece 25. However, valve 10D does not have a resilient membrane 90, therefore not having a barrier that prevents the controlled fluid from flowing into the armature chamber. The plunger tip is enclosed in a resilient, elastic encasement, 98A, and there is an O-ring, 30, between flange 20 and pilot body member 100, replacing outer ring 92. In this embodiment, the regulated fluid moves in through pilot passages 105, enters the armature cavity, and flows into wells 79, 89 and 91 of the armature chamber. Therefore, the armature in this embodiment has to be made of a non-corrosive material (since it is not encased in a non-corrosive fluid). The liquid is allowed out once the armature retracts, and opens passage 106. Actuator 10C also includes solenoid windings 28 wound about solenoid bobbin 14. Housing 18 is shaped in the same way as described above, to hold pole piece 25 against bobbin 14, and secure windings 28 and magnet 23 together. As previously described, armature 80C is slideably mounted in the armature chamber, and pilot body member 100 is attached by threading it onto actuator body 18. Actuator armature 80C also includes spring cavity 82 and spring 84. Armature 80C includes a plunger tip 86 that may have a circular, elliptical, rectangular or other cross-section, such as in the previously described valve actuators.

Figure 4C:
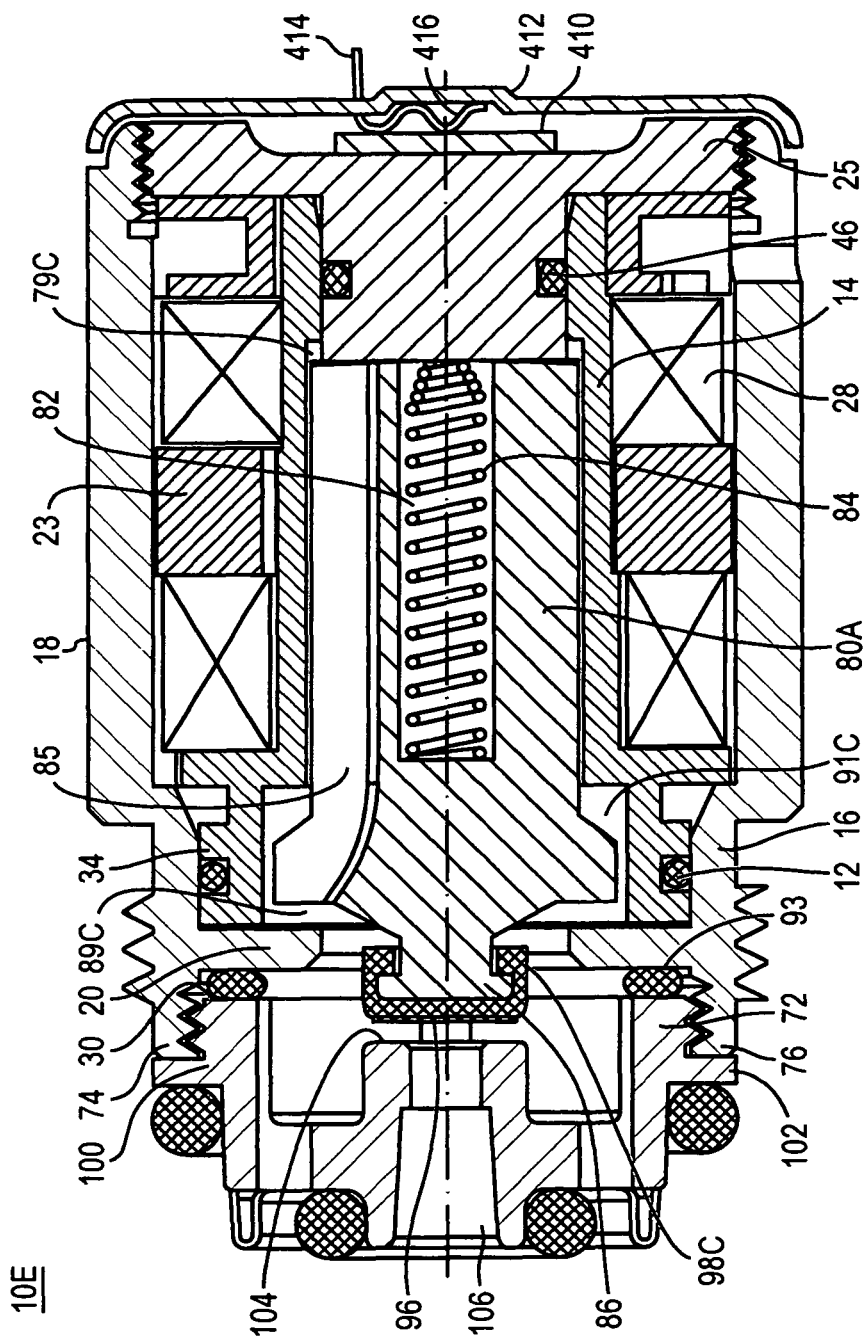
FIG. 4C is a cross-sectional view of a fifth embodiment of the electromagnetic actuator.

FIG. 4C illustrates yet another embodiment of an electromagnetic valve, 10E. Valve 10E is very similar to that of FIG. 4B, and includes all elements described above. However, it has an additional element: a piezoelectric sensor, to control the valve by evaluating the movement of armature 80. Piezoelectric transducer 410 responds to vibrations in the walls of housing 18. Piezoelectric element 410's size and shape have been so chosen to maximize its response to the predominant frequency components, and it normally is mounted in a location where the sounds to be detected are greatest in amplitude or most distinguishable from noise. The sensor includes a terminal 414, which provides electrical communication from the control circuit to one of the sensor 410's electrodes through a contact spring 416 secured in place by a plastic cap 412. This sensor is further explained in the context of the control circuit in the example given in FIGS. 7 and 8, below.

Figure 5:
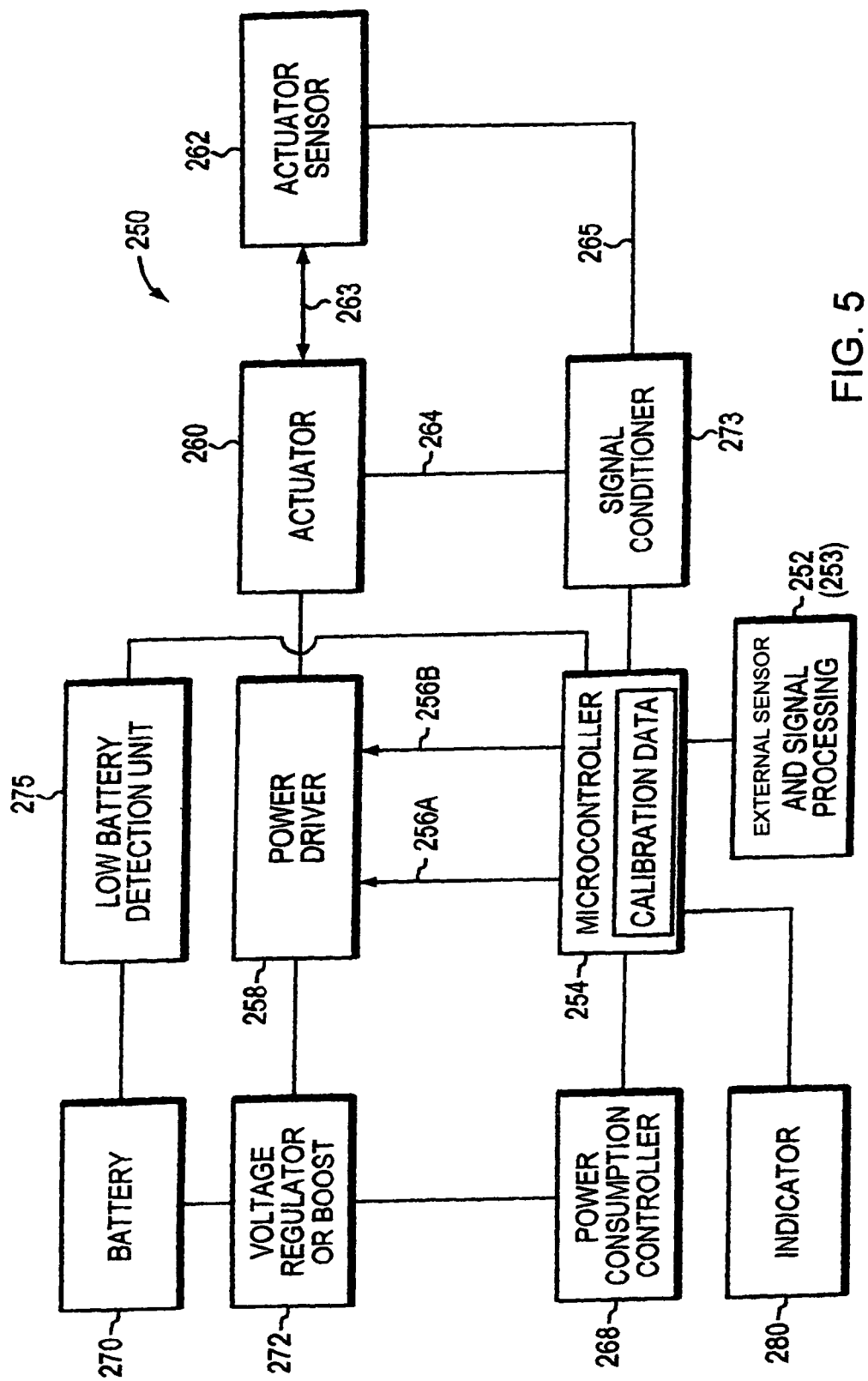
FIG. 5 and FIG. 5A schematically illustrate control electronics for controlling the electromagnetic actuator.
Figure 5A:
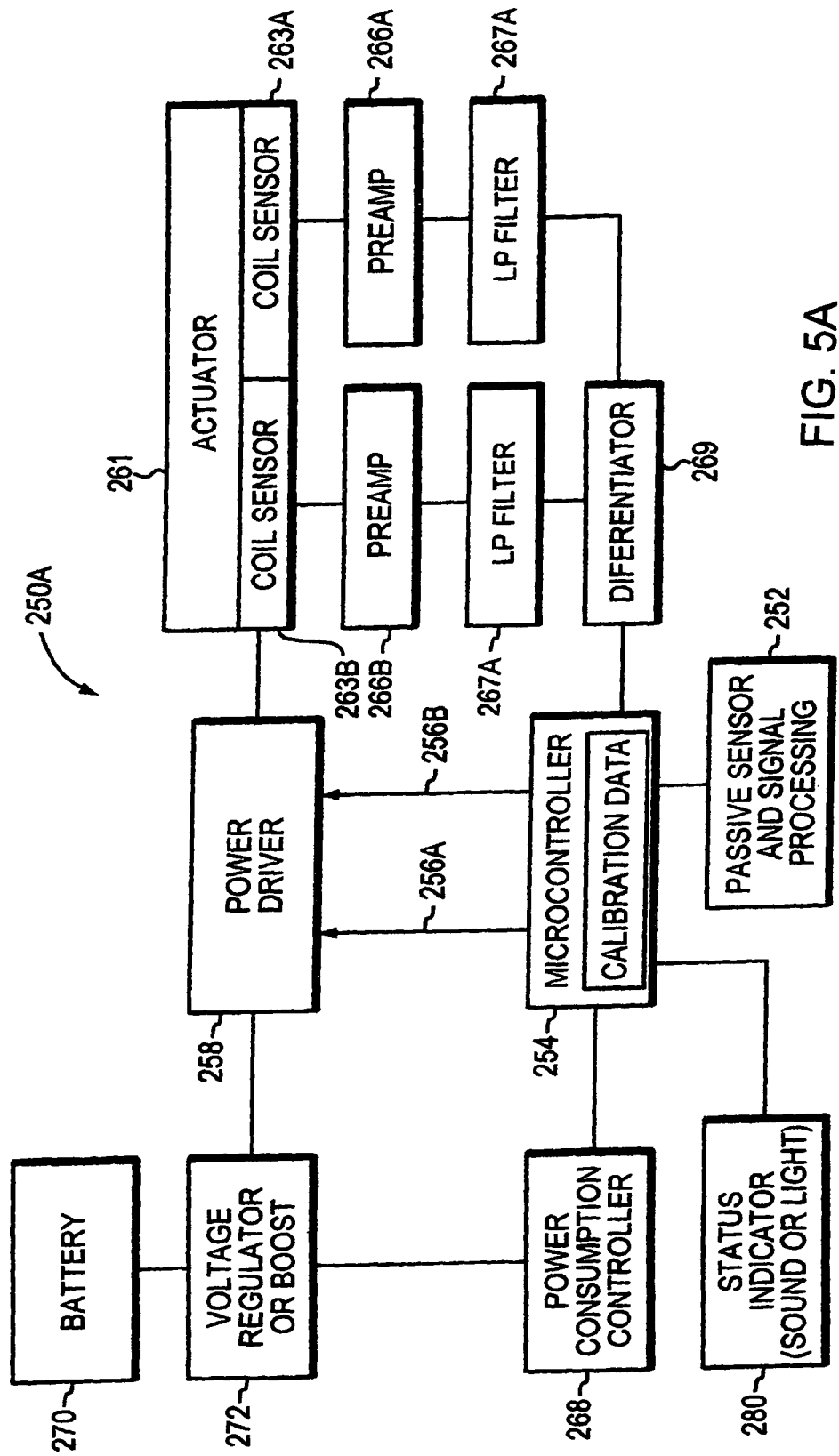

Referring to FIGS. 5 and 5A, the operation of the actuators 10A, 10B, and 10C is controlled by a control circuit 250 or 250A. To open the valve, a power driver 258 applies a drive current to coil 28 of any of the actuators described (represented by actuator 260 in FIGS. 5 and 5A). The current orientation is such that the resultant magnetic flux has the opposite orientation to the force of the flux path 40 of magnet 23, which is shown in FIG. 2. (The flux paths 40 and 42 of magnet 23 depicted in FIG. 2 are the same for all actuators described.) The magnetic flux due to this current orientation also goes against the force of spring 84 for actuators 10B and 10C. Thus, the magnetic flux applied overcomes the closing force for the actuators, so that the valve is opened by applying a drive current to coil 28. To close the valve, the drive current applied to coil 28 has a polarity that induces magnetic flux having the orientation that forces plunger tip 86 onto valve seat 104.

Referring again to FIG. 2, armature 80 is held in position without the application of the drive current (i.e., held in the latched or unlatched position at zero drive current) using the magnetic circuit provided by radial magnet 23. Specifically, radial magnet 23 provides magnetic flux paths 40 and 42 acting on linearly movable armature 80 made of a magnetically soft material. In general, the magnetic force on armature 80 depends on the magnetic properties of the materials in the magnetic circuits, and also depends on two gaps created by the linear displacement of armature 80. Specifically, inside the armature cavity, there is a front gap located between flange 20 (i.e., shelf 20) and a shoulder 81 of armature 80.

There is also a rear gap located between the rear of armature 80 and rear pole piece 25, near a rear chamber 79.

Flux path 40 extends from magnet 23 along and through cylindrical housing 18, through flange 20 and across the front gap to shoulder 81 of armature 80. Flux path 40 then extends along armature 80 through bobbin 14 back to magnet 23. Flux path 42 extends from magnet 23 along and through cylindrical housing 18, through rear pole piece 25 and across the rear gap to armature 80, and then extends along armature 80 and through bobbin 14 back to magnet 23.

After the coil drive linearly displaces armature 80 into the extended position, resilient membrane 90 presses against closure surface 104. In this extended position, the front gap between flange 20 and shoulder 81 is much smaller that the rear gap between armature 80 and rear pole piece 25. Since the front gap is smaller than the rear gap, the force along flux path 40 is larger than the force along flux path 42, and therefore, armature 80 is held in place without any drive current. That is, plunger 86 is held in the closed position solely by the force over the flux path 40.

After application of the opposite coil drive, armature 80 is linearly displaced into the retracted position by the electromagnetic force generated by the drive current in coil 28. In the retracted position, the valve passage is open since resilient membrane 90 no longer presses against closure surface 104. Now, the front gap between flange 20 and shoulder 81 is much larger that the rear gap between armature 80 and rear pole piece 25. Since the rear gap is smaller than the front gap, the force along flux path 42 is larger than the force along flux path 40. Therefore armature 80 is held in the retracted position without any drive current flowing in coil 28.

Referring to FIGS. 2, 4 and 4A, electromagnetic actuators 10A, 10B and 10C are constructed to adjust the sizes of the front gap and the rear gap by rotatably displacing rear pole piece 25 within cylindrical housing 18. By screwing rear pole piece 25 farther into housing 18, pole piece 25 pushes inside the armature cavity coil stop 54, bobbin 14, coil 28 and armature 80 or 80A. Therefore, the linear excursion of armature 80 or 80A is reduced. This also reduces the total size of the front gap and the rear gap. Alternatively, by unscrewing rear pole piece 25 with respect to housing 18 (i.e., increasing the internal cavity size), the linear excursion of armature 80 or 80A is increased. This also increases the total size of the front gap and the rear gap. Therefore, electromagnetic actuators 10A, 10B and 10C are constructed to adjust the magnetic force by adjusting the position of rear pole piece 25 within enclosure housing 18.

Referring again to FIGS. 4 and 4A, the embodiments of actuator 10B and 10C are constructed to provide an increased closure force of plunger tip 86 with respect to closure surface 104. Electromagnetic actuators 10B and 10C are constructed with armatures 80A and 80B, which include a spring cavity 82 and a spring 84. After the coil drive linearly displaces the armature into the extended position, spring 84 further increases the closure force of plunger tip 86, acting in addition to the magnetic force over flux path 40, described above. The embodiments of FIGS. 4 and 4A are used for valves operating at higher pressures, or in the direct flow arrangement, where the fluid pressure acts directly opposite to plunger tip 86 or the armature.

After application of the opposite coil drive to the actuators shown in FIGS. 4 and 4A, the armature 80A or 80B is linearly displaced into the retracted position by the electromagnetic force generated by the drive current in coil 28. In the retracted position, the front gap is much larger that the rear gap, and thus the force along flux path 42 is larger than the sum of the spring force (provided by spring 84) and the force along flux path 40. Therefore the armature is held in the retracted position without any current flowing in coil 28. Spring 84 has a spring constant selected to enable such a retracted state without any drive current. The magnetic circuits are again adjusted by adjusting the position of rear pole piece 25 within cylindrical housing 18.

The above-described latched and unlatched positions maintained without any drive current enable substantial reduction in power consumption. This, in turn, extends the life of battery 270 (FIGS. 5 and 5A).

Membrane 90 isolates the pressurized chamber fluid and prevents mixing of the chamber fluid with the fluid being regulated. Thus, optimally membrane 90 is made of an impermeable material with minimal or no diffusion of the chamber liquid to the input or output conduit and vice versa. Since that the movement of armature 80 also stresses membrane 90 and applies relatively large amounts of pressure, the diffusion of fluids from one side of the membrane to the other may be increased. The diffusion of the chamber fluid out to the input or output conduit would, over time, deplete the chamber of its liquid and cause device failure. Thus, to maximize the efficiency of the invention over time, membrane 90 is preferably composed of a polymer or a polymer blend optimized to withstand the stress of armature movement while it minimizes permeability of the membrane.

The composition of the membrane may include polymer blends and fillers that bring about the proper hardness, maximize tear strength, minimize compression set, minimize extractable components, minimize modulus, and minimize diffusion and maximize impermeability. Components are preferably inert to the fluids being regulated (including any trace amounts of chemicals, e.g., chlorine or fluorine) as well as the chamber fluid, and to any changes in temperature or pH. For example, in a public restroom, the membrane is preferably inert to traces of chemicals present in potable water, as well as in various cosmetic applications. Further, the components of the membrane preferably take into account the way it will be manufactured, as the composition of the membrane can improve the manufacturing process. For example, the fillers can be chosen so as to enhance the properties required for successful demolding of the membrane, and to enhance efficient curing.

For example, membrane 90 may include an EPDM/bromobutyl blend, or Viton®. The first is a blend of EPDM (Ethylene Propylene Diene Monomer) and bromobutyl. EPDM is a rubber principally composed of ethylene and propylene which has low water absorption, as well as excellent abrasion and ageing resistance. It also can be compounded to obtain other desirable qualities. Viton® fluoroelastomer is a high molecular weight polyethylene membrane with the highest retention efficiency of any membrane known so far. EPDM elastomer is available from Harwick Standard Distribution Corporation (Akron, Ohio). Viton® fluoroelastomer is available from R.T. Vanderbuilt Company, Inc. (Norwalk, Conn.).

As described above, the chamber fluid is pressurized and isolated. The fluid composition may be selected to prevent growth of microorganisms which could eventually lead to device's failure. Optionally, to prevent this microorganismal contamination, several important actions can be taken: First, during manufacturing of the actuator, sterilization of the equipment, as well as of the chamber fluid being added to the device, may be performed. This should minimize the chances of contaminating the chamber fluid. Further, a preservative may be added to the armature liquid to eliminate any contaminating organisms. In this case, the preservative may vary depending on the context of the device. For example, in a public restroom, the preservative is best compatible with potable water, as well as cosmetic applications. Examples of possible preservatives to use in this context include Neolone™ 950 and Liquapar Oil™. Neolone™ 950 (2-methyl-4-isothiazolin-3-one and 2-methyl-3(2H) isothiazolinone) is a formaldehyde-free bactericidal solution, found to be very effective at low concentrations, and compatible with fungicides, which may be added separately. Neolone™ 950 is stable in high pH solutions, which include potable water systems, and which are generally difficult to preserve.

In general, the valve actuator may use different types of control circuits such as those described in U.S. Pat. Nos. 5,781,399; 5,803,711; 5,815,365; or 6,021,038, all of which are incorporated herein. FIGS. 5 and 5A schematically illustrate control electronics 250 and 250A, powered by a battery 270, which can drive the valves' actuators and control them in relation to particular signals received by external passive sensor and signal processing unit 252. As shown in FIG. 5, control electronics 250 include battery regulation unit 272, no or low battery detection unit 275, passive sensor and signal processing unit 252, and microcontroller 254. Battery regulation unit 272 provides power for the whole system. Specifically, battery regulation unit 272 provides 6.0 V power to low battery detector 275, and 6.0 V to power driver 258. Furthermore, it provides a regulated 3.0 V power to a microcontroller 254.

The "low battery" detector 275 generates "low battery" signals in the form of pulses to microcontroller 254 to notify the microcontroller of the condition of the battery. Low battery detector 275 is coupled to the battery/power regulation through the 6.0V power it provides to the detector. When power drops below 4.2V, detector 275 generates a pulse to the microcontroller (i.e., a low battery signal). When the "low battery" signal is received, microcontroller 254 will flash indicator 280 (e.g., an LED) with a frequency of 1 Hz, or may provide a sound alarm.

External sensor and signal processing module 252 checks for external signals to open and close the actuator to control a faucet, a bathroom flusher, or another device. Microcontroller 254 operates the valve actuator in response to a trigger signal from module 252 via power driver 258. Control circuit 250 can be constructed to operate different types of external object sensors that detect presence of a user or motion of a user. The external object sensor 252 can be an active optical sensor, a passive optical sensor, an ultrasonic sensor, or a capacitive sensor. Various optical sensors are described in U.S. Pat. Nos. 5,984,262; 6,127,671; or 6,212,697, all of which are incorporated by reference. Preferred passive optical sensors are described in PCT Applications PCT/US03/38730 and PCT/US04/40887, both of which are incorporated by reference.

Referring still to FIG. 5, control electronics 250 receives signals from sensor and signal processing unit 252 and controls the actuator 260, a controller or microcontroller 254, an input element (e.g., the sensor 262), a solenoid driver (power driver 258) receiving power from a battery 270 regulated by a voltage regulator 272. Microcontroller 254 is designed for efficient power operation. To save power, microcontroller 254 is initially in a low frequency sleep mode and periodically addresses sensor 252 to see if it was triggered. After triggering, the microcontroller provides a control signal to a power consumption controller 268, which is a switch that powers up voltage regulator 272 (or a voltage boost, as required), passive sensor and signal processing unit 252, and a signal conditioner 273. (To simplify the block diagram, connections from power consumption controller 268 to passive sensor and signal processing unit 252 and to signal conditioner 273 are not shown.)

Microcontroller 254 can also receive an input signal from an external input element (e.g., a push button) that is designed for manual actuation or control input for actuator 260. Specifically, microcontroller 254 provides control signals 256A and 256B to power driver 258, which drives the actuator 260. Power driver 258 receives DC power from battery 270 and voltage regulator 272 regulates the battery power to provide a substantially constant voltage to power driver 258. An armature sensor 262 (actuator sensor 262) registers or monitors the armature position of actuator 260 and provides a control signal 265 to signal conditioner 273. A low battery detection unit 275 detects battery power and can provide an interrupt signal to microcontroller 254.

Actuator sensor 262 provides data to microcontroller 254 (via signal conditioner 273) about the motion or position of the actuator's armature, and this data is used for controlling power driver 258. The actuator sensor 262 may be present in a number of different ways: an electromagnetic sensor (e.g., a pick up coil), a sound sensor, a capacitive sensor, a Hall effect sensor, an optical sensor, a pressure transducer, or other type of a sensor.

Preferably, microcontroller 254 is an 8-bit CMOS microcontroller TMP86P807M made by Toshiba. The microcontroller has a program memory of 8 Kilobytes and a data memory of 256 bytes. Programming is done using a Toshiba adapter socket with a general-purpose PROM programmer. The microcontroller operates at 3 frequencies ($f_c$=16 MHz, $f_c$=8 MHz and $f_s$=332.768 kHz), wherein the first two clock frequencies ($f_c$) are used in a normal mode and the third frequency ($f_s$) is used in a low power mode (i.e., a sleep mode). Microcontroller 254 operates in the sleep mode between various actuations. To save battery power, microcontroller 254 periodically samples the passive sensor and signal-processing unit 252 for an input signal, and then triggers power consumption controller 268. Power consumption controller 268 powers up signal conditioner 273 and other elements. Otherwise, passive sensor and signal processing unit 252, voltage regulator (or voltage boost) 272 and signal conditioner 273 are not powered to save battery power. During operation, microcontroller 254 also provides data to status indicator 280. Control electronics 250 may receive a signal from a passive sensor or an active sensor. The passive sensor and signal-processing unit includes only a detector providing a detection signal to microcontroller 254.

Low battery detection unit 275 may be low battery detector model no. TC54VN4202EMB, available from Microchip Technology (http://www.microchip.com). Voltage regulator 272 may be the voltage regulator part no. TC55RP3502EMB, also available from Microchip Technology. Microcontroller 254 may alternatively be microcontroller part no. MCU COP8SAB728M9, available from National Semiconductor.

Since the above-described actuator is bistable, the control circuit can typically discontinue current flow after the valve has reached the desired state. Since the time required for the valve to reach the desired state can vary widely, conventional control circuits make the current-flow duration relatively long so that it will be adequate for worst-case conditions. Since most actuations are not performed under worst-case circumstances, though, coil drive typically continues for some time after the valve reaches its stable position. This is a waste of battery energy. To reduce this waste, a control circuit can monitor the armature with a sensor to determine the armature's state, and stop applying coil drive just before or when it reaches its final state. Therefore, a sensor reduces the energy waste that usually occurs in driving the actuator's armature. A sensor can also confirm that the valve is working properly, and could potentially be used in monitoring the valve.

In general, to monitor the position of plunger tip 86 for regulation by the control electronics, the actuators include an actuator sensor or a coil sensor. This internal sensor, when placed on the housing, is able to detect vibrations from the impact of plunger tip 86 onto surface 104 (i.e., sound made by the armature in reaching the first end position). Alternatively, this internal sensor detects current passing through solenoid 28. Another option is for the sensor to measure the electromagnetic force from the solenoid. These measurements show the state of the condition of the valve. The sensor may be a piezoelectric transducer, a capacitive transducer, an inductive transducer, an optical transducer, or any other transducer directly or indirectly coupled to armature 80. Once the armature reaches the desired position, the internal sensor generates a sensor output indicative of the position sensed and provides this output to microcontroller 254.

Upon application of an opposite coil drive from microcontroller 254, power driver 258 provides drive current in the second drive direction to coil 28 and thereby drives the armature to a second end position. The internal sensor detects the armature position or the armature reaching the second end position. Microcontroller 254 not only controls applying the coil drive to coil 28, but is also responsive to the sensor output meeting a predetermined second current-termination criterion, and stops applying coil drive to the coil in the second direction. The first and second current-termination criteria may in general differ.

For example, a piezoelectric transducer can monitor location of armature 80 by taking advantage of the sound that armature 80 makes when it reaches either end of its travel. We use the term "sound" here in the broad sense of a pressure or strain wave. In most embodiments, moreover, the predominant frequency components of the "sound" are typically above the audible range. The actuator sensor 262 can be a piezoelectric transducer that responds to vibrations in the housing wall. The piezoelectric element's size and shape have typically been so chosen as to maximize its response to the predominant frequency components, and it normally is mounted in a location where the sounds to be detected are greatest in amplitude or most distinguishable from noise.

Alternatively, the armature sensor is a capacitive sensor that includes one plate located on a stationary actuator surface and the other plate located on a surface of moving armature 80. The movement of armature 80 causes relative displacement of the two capacitor plates, which in turn changes the measured capacitance value. Based on the capacitance value, the capacitive sensor determines the end position or any instantaneous position of armature 80 (and thus the position of plunger tip 86).

Alternatively, the armature sensor is an optical sensor that includes an optical source and an optical detector. The source emits optical radiation that is reflected from (or possibly transmitted through) a surface of the armature and detected by the detector. The reflection surface modifies the emitted optical signal. Thus, the detected signal varies depending on the position of the armature (i.e., instantaneous location of plunger tip 86). Based on the detected optical signal, the optical sensor determines the end position or any instantaneous position of armature 80. Alternatively, the armature sensor uses a source of electromagnetic radiation and a corresponding detector. The detector measures perturbation of the generated electromagnetic radiation by the armature depending on the location of the armature. Based on the detected perturbed radiation, the sensor determines the end position or any instantaneous position of the armature.

A terminal can provide electrical communication to one of the transducer's electrodes through a contact spring secured in place by a plastic cap, for example, while the other transducer electrode may be shared with coil 28, e.g., if the transducer is secured to the housing 18 by conductive bonding between the housing and that electrode.

Referring to FIG. 5, the sensor provides a sensor signal when armature 80 reaches an endpoint and causes housing vibration: as sonic amplitude is higher when the valve opens than when it closes, microcontroller 254 sets a threshold whose value when the valve is being opened is different from the value it has when the valve is being closed. It can, for example, convert the resistance of a photoresistor checking for light signals to a pulse, which is sent to microcontroller 254 through the charge pulse signal. Pulse width changes correspond to the changes in light detected for an actuator, and this will, in turn, cause control of the actuator (i.e., opening or closing of a valve due to the light changes).

For example, upon receiving a trigger signal from passive sensor and signal processing unit 252, microcontroller 254 may provide an "open" signal to power driver 258, when the sensor detects a user leaving a flusher's vicinity. This causes current to be driven through actuator 28's coil in the direction that will cause the valve to open. Furthermore, microcontroller 254 may provide a "close" signal after the valve has been open for a predetermined duration.

When the open signal current starts flowing, the sensor output is less than the threshold, so the sensor is not receiving sound of a magnitude consistent with the armature's reaching the end of its travel. The microcontroller 254 therefore keeps the OPEN signal asserted. But the sensor's output changes in response to the sound made by the armature 80 at the end of its travel. When armature 80 has reached that point, the valve will stay open without current flow, so the microcontroller de-asserts its OPEN output and thereby stops applying drive current to actuator coil 28. The result usually is that the current-flow duration has been much less than the time required to open the valve under worst-case conditions, so the system has saved considerable energy.

To close the valve, the microcontroller 254 asserts its CLOSE output and thereby applies the drive signal to actuator coil 28 in the opposite direction. Again, the microcontroller allows current flow only until sensor 262 informs it that the armature has reached the end of its travel.

Control circuit 250 can be used to control not only the drive signal's duration but also its magnitude. The drive signal duration may be in the range of less than about 1 msec to about 10 msec, and preferably in the range of 1.5 msec to 8 msec. A coil-drive level high enough for ordinary operation may occasionally be inadequate, and the coil-drive level can be increased if the armature fails to reach the endpoint. One way to increase the coil-drive level is to increase the voltage on capacitors discharged through the actuator coil.

Under some conditions, various factors (e.g., element expansion due to high temperature, high actuator fluid viscosity due to low temperature, degradation of membrane 90 or other actuator elements) may make it harder than usual to displace armature 80. However, the drive signal is normally set at normal operation values. Otherwise, energy consumption would be unnecessarily high if, during normal operation, the battery voltage were set high enough to deal with such more-difficult circumstances. The present embodiment therefore regularly uses a battery-voltage level that is adequate for normal situations, and thus saves power.

Moreover, although a simple amplitude criterion has been employed to determine whether the armature has reached the end of its travel, other criteria may be found preferable for some applications. For instance, the sonic signal could be sampled and compared by signal processing with a stored waveform known to be characteristic of the armature's reaching one of its endpoints. The stored signal may be different for different endpoints, and there may be circumstances in which it will be considered valuable to use such a comparison to distinguish between the actuator's two states.

FIG. 5A schematically illustrates another embodiment of control electronics 250. Control electronics 250A receives signals from passive sensor and signal processing unit 252 and controls actuator 261. As described above, the control electronics also includes microcontroller 254, solenoid driver 258 (i.e., power driver), voltage regulator 272, and a battery 270. Solenoid actuator 261 includes two coil sensors, 263A and 263B (for example, wire loops around coil 28). Coil sensors 263A and 263B provide a signal to the respective preamplifiers 266A and 266B and low pass filters 267A and 267B. A differentiator 269 provides the differential signal to microcontroller 254 in a feedback loop arrangement.

To open a fluid passage, microcontroller 254 sends an OPEN signal 256B to power driver 258, which provides a drive current to the drive coil of actuator 261 in the direction that will retract the armature. At the same time, coils 263A and 263B provide induced signal to the conditioning feedback loop, which includes the preamplifier and the low-pass filter. If the output of differentiator 269 indicates less than a selected threshold calibrated for the retracted armature (i.e., signaling that the armature did not reach a selected position), microcontroller 254 maintains the OPEN signal 256B asserted. If no movement of the solenoid armature is detected, microcontroller 254 can apply a different (higher) level of OPEN signal 256B to increase the drive current (up to several times the normal drive current) provided by power driver 258. This way, the system can move the armature, which is stuck due to some operational problem or debris located in the armature chamber.

Microcontroller 254 can detect the armature displacement (or even monitor armature movement) using induced signals in coils 263A and 263B provided to the conditioning feedback loop. As the output from differentiator 269 changes in response to the armature displacement, microcontroller 254 can apply a different (lower) level of OPEN signal 256B, or can turn off OPEN signal 256B, which in turn directs power driver 258 to apply a different level of drive current. The result usually is that the drive current is reduced, or the duration of the drive current is much shorter than the time required to open the fluid passage under worst-case conditions (those that have to be used without using an armature sensor). Therefore, the control system saves considerable energy and thus extends the life of battery 270.

Advantageously, the arrangement of coil sensors 263A and 263B can detect latching and unlatching movement of the actuator armature with great precision. (However, a single coil sensor, or multiple coil sensors, or capacitive sensors may also be used to detect movement of the armature.) Microcontroller 254 can direct a selected profile of the drive current applied by power driver 258. Various profiles may be stored in microcontroller 254, and may be actuated based on the fluid type, the fluid pressure, the fluid temperature, the time actuator 261 has been in operation since installation or last maintenance, battery level, input from an external sensor (e.g., a movement sensor or a presence sensor), or other factors. Based on the liquid pressure and the known sizes of the orifices, the automatic valve can deliver a known amount of liquid.

Figure 6:
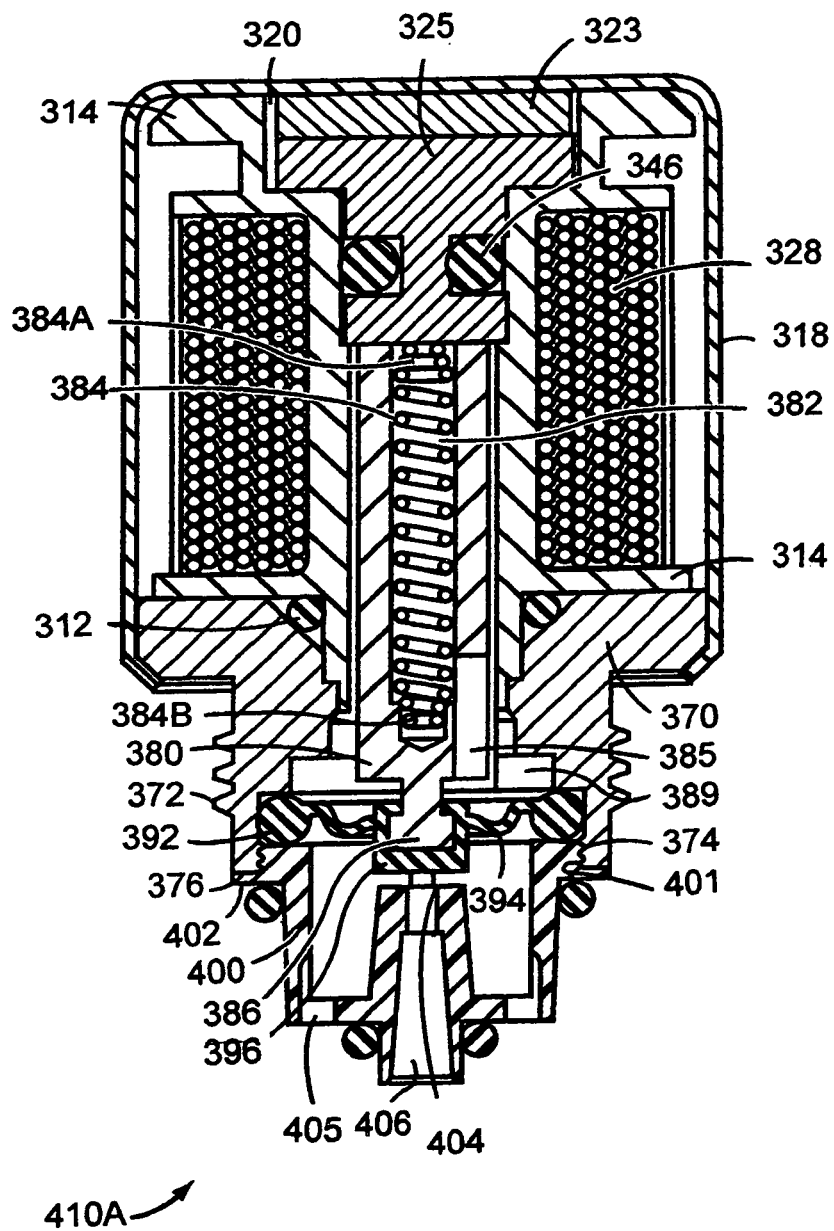
FIG. 6 is a cross-sectional view of another embodiment of an electrically operated valve actuator.

Similar valves can be constructed which may again be latching (including a magnet) or, alternatively, non-latching types (and not include a magnet). Further, for the latching valves, the magnet location can differ. FIGS. 6 and 6A illustrate yet other embodiments of a latching electrically operable valve actuator. Valve actuator 410A includes a magnet 323, a ferromagnetic pole piece 325, a ferromagnetic armature 380, slideably mounted in an armature pocket formed between solenoid bobbin 314 and pole piece 325, and an actuator base 370. Valve 410A also includes solenoid windings 328 wound about solenoid bobbin 314, resilient membrane 390 and a pilot body member 400. Resiliently deformable O-ring 312 forms a seal between solenoid bobbin 314 and actuator base 370, all of which are held together by actuator housing 318. Bobbin 314 forms a recess 320 for a distal end of pole piece 325 and disk-shaped magnet 323. Housing 318 is crimped at actuator base 370 to hold magnet 323 and pole piece 325 against bobbin 314 and thereby secure windings 328 and actuator base 370 together. Valve actuator 310A may be constructed either as latching (as shown in FIG. 6) or non-latching.

Referring still to FIGS. 6 and 6A, actuator base 370 includes a wide base body in contact with bobbin 314, crimped inside housing 318, and a narrowed base extension. The narrowed base extension of actuator base 370 includes external threads 372 and internal threads 374. Internal threads 374 are made to fit complemental external threads 401 of the pilot body member 400 to engage a resiliently deformable membrane 390.

Resiliently deformable membrane 390 includes an outer ring 392, compliant region 394, and a resilient, C-shaped region 396. Membrane 390 may be an EPDM diaphragm or another type of diaphragm. In general, deformable membrane 390 and region 396 may have various shapes and sizes, depending on the arrangement and size of pilot body member 400 and the plunger 386 of armature 380. Deformable membrane 390 is made of a durable material and may at least partially be made of an elastic material. Furthermore, the material of deformable membrane 390 is selected to resist possible degradation caused by the fluid regulated, which will collect in pilot body member 400. Therefore, the same valve actuator can be fabricated for various industrial, agricultural applications, while only deformable membrane 390 and pilot body member 400 are specifically designed for the regulated fluid. In medical applications, membrane 390 and pilot member 400 are sterilized or may be made of disposable material. Therefore, the valve actuator may be reused with new disposable or sterilization-resistant elements.

Like the actuators shown in FIGS. 4 and 4A, the actuator in FIG. 6 has a ferromagnetic armature 380 including a tip portion 386 (i.e., plunger 386) and a spring cavity 382 arranged to receive spring 384, having tapered end portions 384A and 384B. The tapered spring ends enable machine sorting and assembly. Ferromagnetic armature 380 also includes a passage 385 enabling fluid communication between cavity 382 and front chamber 389 sealed by O-ring seal 346 and membrane 390. This again creates a fluid-tight seal for the armature liquid, wherein membrane 390 protects armature 380 from exposure to external fluid being regulated, which is in contact with pilot body member 400. As mentioned above, the armature liquid preferably has a very low viscosity and is non-compressible and non-corrosive. Furthermore, bobbin 314, pole piece 325, armature 380 and passage 385 enable a relatively unobstructed flow of the sealed armature fluid as the actuator moves, i.e., there is a low-resistance path for the armature fluid.

The actuator assembly includes pilot body member 400 reproducibly secured to the operator assembly, which provides numerous advantages. Specifically, pilot body member 400 includes external threads 401, which engage complementary threads 374 in pole piece 370, and a flange 402. Flange 402 butts against a shoulder portion 376 of pole piece 370 providing a positive stop to the pilot body member's being fastened onto the operator assembly. This positive stop provides a known, substantially constant distance and geometry between an external surface of resilient portion 386 and a valve seat 404. The known, substantially constant distance and geometry in turn assures reproducible closing and opening action of the valve member.

In general, during field maintenance or replacement, the valve actuator or other elements may be removed or replaced, which in turn may cause a change in the distance and geometry between valve seat 404 and element 386 of the valve actuator. Furthermore, various piece-part tolerances and O-ring deformability may result in some variability in the position of the pilot body's central conduit 406 with respect to the tip 386, covered by resilient member 396. This variability can cause resultant variability in the valve operation or during the open and close times. On the other hand, the pilot-valve and seat spacing and geometry are set when pilot member 400 is pre-assembled onto the valve operator, as shown in FIGS. 6 and 7.

In the closed position, resilient portion 396 seals the opening at valve seat 404, and thus prevents fluid flow from the pilot passages 405 to conduit 406. Pilot body member 400 may be coupled to a diaphragm via pilot passages 405 and 406. Thus, the use of pilot body member 400 is a novel improvement of the operation of diaphragm-controlled flush valves, for example, disclosed in U.S. Pat. Nos. 5,125,621; 5,195,720; 5,196,118; and 5,244,179, which are incorporated by reference. Furthermore, several diaphragms may be cascaded together, wherein passages 405 and 406 are connected to a first, smaller diaphragm, which in turns controls a second larger diaphragm that enables flow of a large amount of fluid pass the diaphragm in its open state. These two diaphragms linked together create an amplification effect for effectively controlling fluid flow by a diaphragm.

Figure 7:
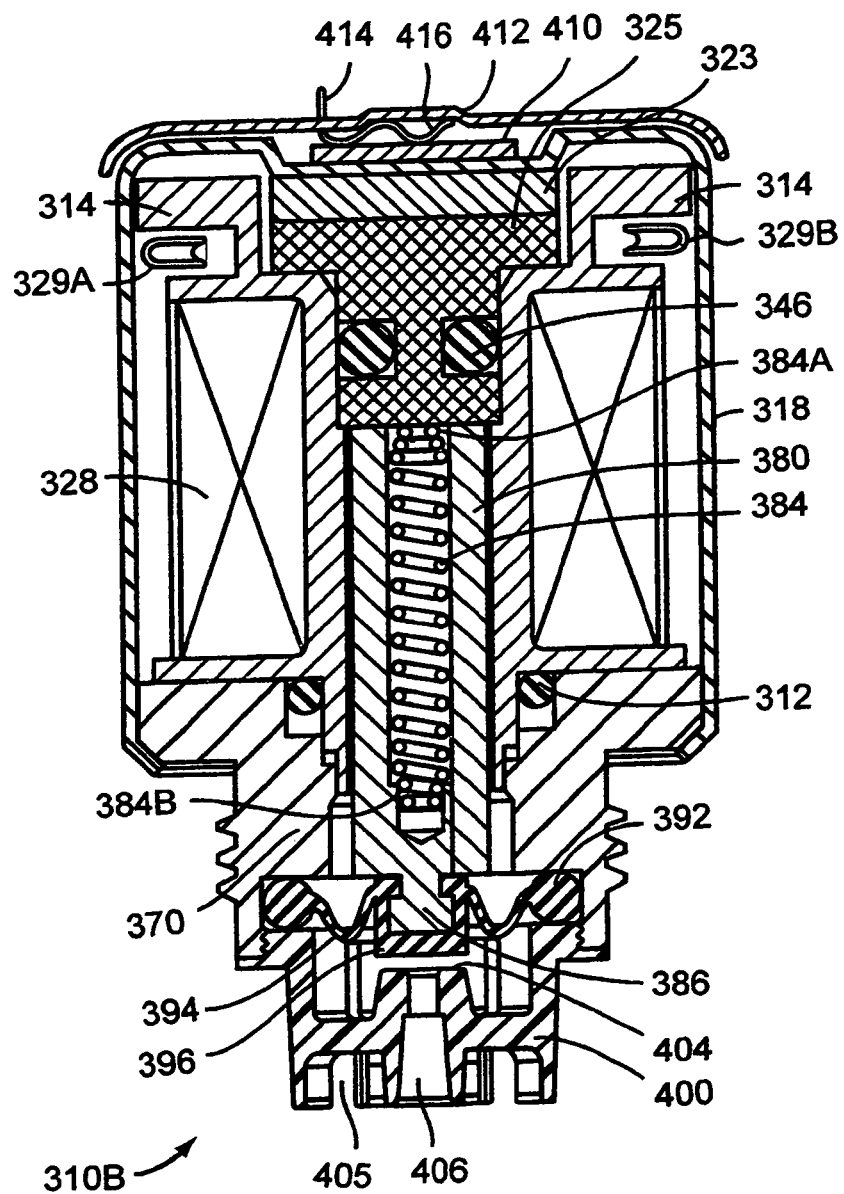
FIG. 7 is a cross-sectional view of the actuator shown in FIG. 6 including a piezoelectric transducer.

FIG. 7 illustrates another embodiment of the valve actuator. Valve actuator 310B includes coil 328 wound on bobbin 314, and actuator base 370 mounted inside an actuator housing 318. The latching version of valve actuator 310B includes latching magnet 323, ferromagnetic pole piece 325, and a ferromagnetic armature 380, slideably mounted in an armature pocket formed between solenoid bobbin 314 and pole piece 325, and an actuator base 370. Resiliently deformable O-ring 312 forms a seal between solenoid bobbin 314 and actuator base 370, and O-ring 346 forms a seal between pole piece 325 and solenoid bobbin 314. Bobbin 314 forms recess 320 shaped for a distal end of pole piece 325 and disk-shaped magnet 323. Valve actuator 310B also includes a position sensor such as a piezoelectric transducer 410 located within sensor housing 412. A non-latching version of valve actuator 310B does not include latching magnet 323, but may optionally include the position sensor in the place of magnet 323. As described above, these actuator elements are crimped inside solenoid housing 318.

Referring still to FIG. 7, valve actuator 310B also includes resiliently deformable membrane 390 located between actuator base 370 and pilot body member 400. As described above, actuator base 370 includes a wide base body in contact with bobbin 314, and a narrowed base extension. The narrowed base extension of actuator base 370 includes external threads 372 and internal threads 374. Pilot body member 400 includes external threads 401, which engage complementary internal threads 374, and flange 402, all as in the actuator in FIG. 6. (Alternatively, actuator base 370 and pilot body member 400 may be connected by other types of locking mechanisms.) Flange 402 butts against a shoulder portion 376 of pole piece 370 providing a positive stop to the pilot body member's being screwed onto the operator assembly. This positive stop again provides a known, substantially constant distance and geometry between an external surface of resilient portion 396 and a valve seat 404.

As described above, resiliently deformable membrane 390 includes outer ring 392, compliant region 394, and resilient, C-shaped region 396. There are various possible shapes and sizes of deformable membrane 390 and region 396, depending on the arrangement and size of pilot body member 400 and plunger 386.

Ferromagnetic armature 380 includes plunger, or plunger tip 386 and a spring cavity 382 arranged to receive spring 384, having tapered end portions 384A and 384B. The tapered spring ends enable machine sorting and assembly. Plunger tip 386 may have a circular, elliptical, rectangular or another cross-section. Ferromagnetic armature 380 also includes a passage 385 (as shown in FIG. 6A) enabling fluid communication between cavity 382 and a chamber 389 sealed by O-ring seal 346 and membrane 390. This again creates a fluid-tight seal for the armature liquid, wherein membrane 390 protects armature 380 and plunger 386 from exposure to external fluid located in contact with pilot body member 400. That is, the entire armature 380 is surrounded by the armature liquid that has substantially equilibrated pressure being applied to the armature surface (i.e., armature 380 substantially "floats" in the armature liquid). As mentioned above, the armature liquid preferably has a very low viscosity and is non-compressible and non-corrosive. Furthermore, bobbin 314, pole pieces 325 and 370, armature 380 and passage 385 enable a relatively unobstructed flow of the armature fluid as the actuator moves, i.e., there is a low-resistance path for the armature fluid.

Advantageously, the actuator assembly includes pilot body member 400 reproducibly secured to the operator assembly, as described above. Flange 402 butts against a shoulder portion 376 of pole piece 370, providing a positive stop that provides a known, substantially constant distance and geometry between an external surface of resilient portion 396 and a valve seat 404. The known, substantially constant distance and geometry in turn assures reproducible closing and opening action of the valve member. Furthermore, pilot body member 400 may be shaped to receive a diaphragm.

Figure 8:
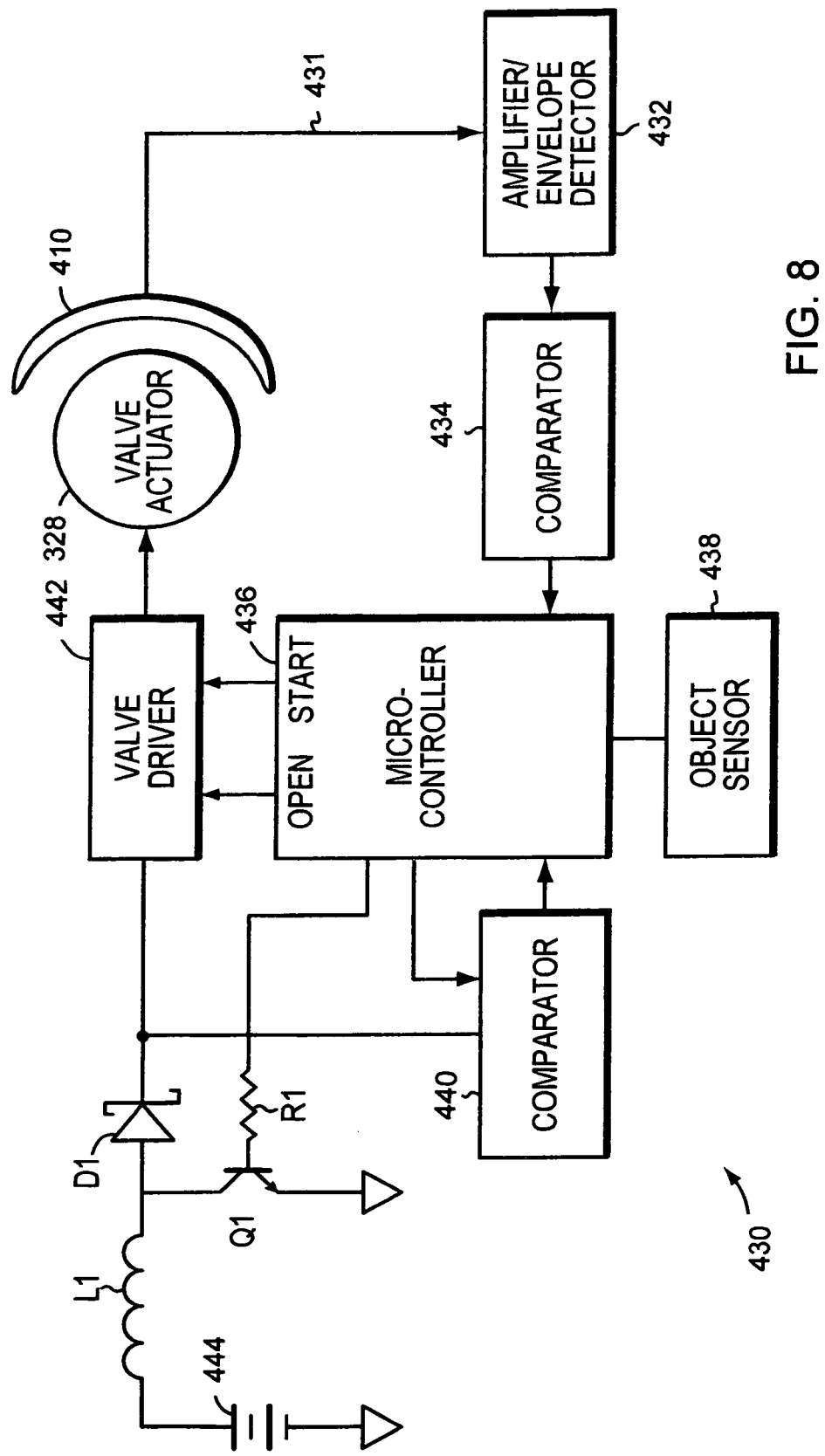
FIG. 8 is a block diagram of another control system for the actuator.

FIG. 8 is a partially schematic and partially diagrammatic illustration of a control circuit used for valve actuator 410B. Control circuit 430 includes a sensor amplifier and envelope detector 432, a comparator 434, a microcontroller 436 receiving signals from an object sensor 438, a comparator 440 and a valve driver 442. To close the valve, valve driver 442 applies a drive voltage, e.g., through terminals 329A and 329B (shown in FIG. 7), to pass a drive current through coil 328, as described in U.S. Pat. Nos. 6,293,516 and 6,305,662, both of which are incorporated by reference.

In general, the valve actuator may use different types of control circuits such as the circuits described in U.S. Pat. Nos. 5,781,399; 5,803,711; 5,815,365; or 6,021,038. The drive current induces the corresponding magnetic flush guided largely by ferromagnetic housing 318, rear pole piece 325, and front pole piece 370. In the latching embodiment, the drive voltage's polarity is such that the resultant magnetic flux opposes that of the permanent magnet 323. This breaks the magnet 323's hold on armature 380 and allows return spring 384 to urge plunger tip 386 together with membrane portion 396 onto valve seat 404. Once the valve has thus closed, the return spring keeps it closed without any further assistance from coil 328. In the closed state, the magnetic force by magnet 323 on armature 380 is less than that of return spring 384 due to the armature 380's increased distance from magnet 323.

To open the valve, valve driver 442 applies drive voltage in the opposite direction so the resultant magnetic flux has the same orientation as the flux from magnet 323. Thus, the applied magnetic flux reinforces that of the permanent magnet 323 and overcomes the force of return spring 384. Therefore, armature 380 moves toward magnet 323, and in the retracted position of plunger tip 386, the permanent magnet 323's force is great enough to hold armature 380 against the return spring 384's force without applying any "hold" drive current. On the other hand, in the non-latching embodiment, the "hold" drive current must be applied since there is no permanent magnet 323.

Because of the latching valve's bistable nature, control circuits that operate it typically discontinue current flow after the valve has reached the desired state. Since the time required for the valve to reach the desired state can vary widely, conventional control circuits make the current-flow duration relatively long so that it will be adequate for worst-case conditions. Since most actuations are not performed under worst-case circumstances, though, coil drive typically continues for some time after the valve reaches its stable position. This is a waste of battery energy. To reduce this waste, control circuit 430 can monitor the armature to determine whether the armature has reached its endpoint, and it stops applying coil drive just before or when that occurs.

In general, to monitor the position of plunger 386, valve actuator 310B includes a position sensor that may be a piezoelectric transducer, a capacitive transducer, an inductive transducer, an optical transducer, or any other transducer directly or indirectly coupled armature 380. For example, piezoelectric transducer 410 monitors location of armature 380 by taking advantage of the sound that armature 380 makes when it reaches either end of its travel, as described above.

In the illustrated embodiment of FIG. 7, the armature sensor is piezoelectric transducer 410 that responds to vibrations in the housing wall. The piezoelectric element 410's size and shape have typically been so chosen as to maximize its response to the predominant frequency components, and it normally is mounted in a location where the sounds to be detected are greatest in amplitude or most distinguishable from noise. Alternatively, the armature sensor is a capacitive sensor that includes one plate located on a stationary actuator surface and the other plate located on a surface of moving armature 380. The movement of armature 380 causes relative displacement of the two capacitor plates, which in turn changes the measured capacitance value. Based on the capacitance value, the capacitive sensor determines the end position or any instantaneous position of armature 380 (and thus the position of plunger 386).

Alternatively, the armature sensor is an optical sensor that includes an optical source and an optical detector. The source emits optical radiation that is reflected from (or possibly transmitted through) a surface of the armature and detected by the detector. The reflection surface modifies the emitted optical signal. Thus, the detected signal varies depending on the position of the armature (i.e., instantaneous location of plunger 386). Based on the detected optical signal, the optical sensor determines the end position or any instantaneous position of armature 380. Alternatively, the armature sensor uses a source of electromagnetic radiation and a corresponding detector. The detector measures perturbation of the generated electromagnetic radiation by the armature depending on the location of the armature. Based on the detected perturbed radiation, the sensor determines the end position or any instantaneous position of the armature.

Referring again to FIG. 7, a terminal 414 provides electrical communication to one of the transducer 410's electrodes through a contact spring 416 secured in place, for example, by a plastic cap 412. The other electrode of transducer 410 may be shared with coil 328, e.g., if the transducer is secured to the housing 318 by conductive bonding between the housing and that electrode.

Referring to FIG. 8, piezoelectric sensor 410 provides a sensor signal 431 to amplifier and envelope detector 432, which includes an amplifier tuned to the expected sound's predominant (typically ultrasonic-range) frequency components. Amplifier and envelope detector 432 rectifies the resultant filtered signal, and low-pass filters the result to produce an output representative of the tuned-amplifier output's envelope. When armature 380 reaches an endpoint and causes housing vibration, the resultant envelope value exceeds a threshold that a comparator 434 applies. Since in the illustrative embodiment the sonic amplitude is higher when the valve opens than when it closes, a microcontroller 436 sets a comparator threshold whose value when the valve is being opened is different from the value it has when the valve is being closed.

Microcontroller 436 may operate the valve actuator in response to a trigger signal from an object sensor 438. Control circuit 430 can be constructed to operate with different types of object sensors that detect presence or motion. For example, object sensor 438 may be an ultrasonic sensor, a capacitive sensor, or an optical sensor such as any one of the sensors described in U.S. Pat. Nos. 5,984,262; 6,127,671; or 6,212,697, all of which are incorporated by reference.

According to one embodiment, object sensor 438 is an optical sensor described in U.S. Pat. No. 6,212,697. The optical sensor includes a light source and a light detector. The light source (e.g., an infrared LED) is disposed behind a lens having a generally circular portion of its optically useful part. The source lens forms a rear surface that is spherically convex, having a 0.63-inch radius of curvature and a peripheral edge that defines a plane normal to a line that extends downward to the right at an angle of 18.6 degrees with the horizontal. The lens's front, exit surface is also spherically convex, having a 2.0-inch radius of curvature and a peripheral edge that defines a plane normal to a line that extends downward to the left at an angle of 9.8 degrees with the horizontal. The source is positioned to provide a radiation pattern described and shown in U.S. Pat. No. 6,212,697. The radiation detector (e.g., a photodiode) is located behind a receiver lens having shapes of left and right faces the same as those of the transmitter lens's corresponding surfaces. The receiver lens surfaces collect light received from a target (e.g., a person in front of a urinal) and tend to direct it toward the radiation detector. This arrangement is responsible a receiver pattern also described and shown in U.S. Pat. No. 6,212,697.

For example, upon receiving a trigger signal from object sensor 438, microcontroller 436 may provide an "open" signal to valve driver 442, when the sensor detects a user leaving the flusher's vicinity. Furthermore, microcontroller 436 may provide a "close" signal after the valve has been open for a predetermined period of time. To open the valve, the microcontroller sets an OPEN signal applied to a valve-driver circuit 442. This causes that circuit to drive current through the actuator 328's coil in the direction that will cause the valve to open.

When that current starts flowing, comparator 434's output initially indicates that amplifier 432's output is less than the threshold, so the amplifier is not receiving sound of a magnitude consistent with the armature's reaching the end of its travel. The microcontroller 436 therefore keeps the OPEN signal asserted. But comparator 434's output changes in response to the sound made by the armature 380 at the end of its travel. When armature 380 has reached that point, the valve will stay open without current flow, so the microcontroller de-asserts its OPEN output and thereby causes the valve driver 442 to stop applying drive current to actuator coil 328. The result usually is that the current-flow duration has been much less than the time required to open the valve under worst-case conditions, so the system has saved considerable energy.

To close the valve, microcontroller 436 asserts its CLOSE output and thereby causes the valve driver 442 to apply the drive signal to actuator coil 328 in the opposite direction. Again, the microcontroller allows current flow only until comparator 434 informs it that the armature has reached the end of its travel.

Control circuit 430 can be used to control not only the drive signal's duration but also its magnitude. The drive signal duration may be in the range of less than about 1 msec to about 10 msec, and preferably in the range of 1.5 msec to 8 msec. A coil-drive level high enough for ordinary operation may occasionally be inadequate, and the coil-drive level can be increased if the armature fails to reach the endpoint. One way to increase the coil-drive level is to increase the voltage on capacitors discharged through the actuator coil.

FIG. 8 depicts the valve driver 442 as being powered by a battery 444. The valve driver 440 typically includes energy-storage capacitors, which the battery 444 charges up between actuations through an inductor L1 and a Shottky diode D1. When the microcontroller 436 asserts its OPEN or CLOSE signal, the driver discharges the capacitors through actuator coil 328. Ordinarily, it is the voltage of battery 444 itself that determines the voltages to which the capacitors will be charged, and this in turns determines coil current and thus armature force.

Under some conditions, various factors (e.g., element expansion due to high temperature, high actuator fluid viscosity due to low temperature, degradation of membrane 390 or other actuator elements) may make it harder than usual to displace armature 380. However, the drive signal is normally set at normal operation values. Otherwise, energy consumption would be unnecessarily high if, during normal operation, the battery voltage were set high enough to deal with such more-difficult circumstances. The present embodiment therefore uses a battery-voltage level that is adequate for normal situations, but not for more-difficult ones.

Control circuit 430 is constructed to increase the capacitor voltage if the armature has not moved after initial application of drive signal, or has not reached the end of its travel within a predetermined maximum current-flow duration. Specifically, microcontroller 436 turns the valve driver off temporarily when the predetermined maximum current-flow duration is reached, and it begins to pulse a transistor Q1 through a current-limiting resistor R1. During each pulse, the transistor draws current from battery 444 through inductor L1. Because of diode D1, though, it does not discharge the valve driver's capacitors. At the end of each pulse, transistor Q1 turns off, and the resultant electromotive force in inductor L1 causes current to continue to flow and thereby charge the drive circuit's capacitors through diode D1 even if the battery voltage exceeds that of the battery 444. So those capacitors can be charged to voltages that exceed those of the battery.

To achieve the appropriate capacitor voltage, a comparator 440 compares the capacitor voltage to a level that microcontroller 436 sets. In response to the comparator's resultant output, microcontroller 436 increases the pulses's duty cycle if the capacitor voltage is less than the threshold, and it decreases their duty cycle if the capacitor voltage exceeds the threshold. The threshold is set higher than the battery voltage, so the force on the armature is greater and more likely to open or close the valve when the microcontroller then turns the valve driver on again.

The illustrative embodiment is only one of many that can employ the present invention's teachings. For example, although we prefer to use a sonic sensor—in particular, an ultrasonic transducer—other ways of detecting the end of armature travel can be used instead. Also, although the illustrated embodiment controls coil-drive duration both when the valve is being opened and when it is being closed, some embodiments may control that duration only during opening or only during closing. And latching-actuator systems that operate mechanisms other than valves can also benefit from the present invention's teachings.

Figure 9:
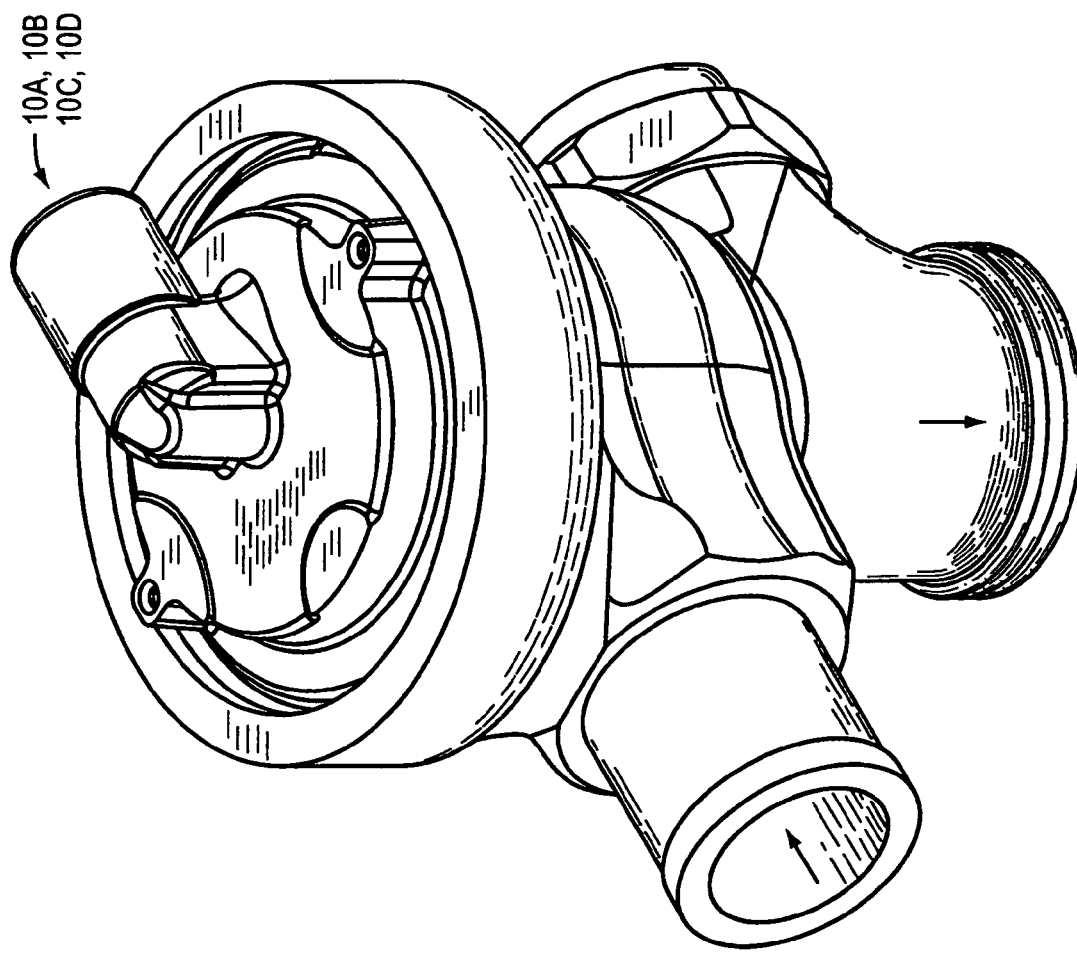
FIG. 9 is a perspective view of an automatic bathroom flusher using the electromagnetic actuator of FIG. 1.

The above-described actuators can be used in many different applications. For example, FIG. 9 is a perspective view of an automatic bathroom flusher using electromagnetic actuator 10A, 10B, 10C, or 10D. This automatic bathroom flusher is described in detail in U.S. application Ser. No. 10/783,906, filed on Feb. 20, 2004, or US patent publication US 2004/0164261 A1, which is incorporated by reference.

Furthermore, the above-described valve actuators are suitable for numerous other applications. For example, the described valve actuator can be used in a two-fluid valve described in U.S. Application Ser. No. 718,026 filed on Nov. 20, 2000, which is hereby incorporated by reference. Alternatively, the valve actuator can be used in a bathroom flusher described in US patent application US 2004/0232370 A1, which is hereby incorporated by reference. Alternatively, the valve actuator can be used in a faucet described in US patent application US 2004/0221899 A1, which is hereby incorporated by reference. Alternatively, the valve actuator can be used in a fluid dispensing system described in U.S. Pat. No. 6,161,726 or PCT Application PCT/US99/30898 (published as WO 00/38561), both of which are incorporated by reference. Furthermore, the valve actuator can be used in various irrigation systems used in agriculture or gardening.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications, all of which are incorporated by reference as if fully reproduced herein. The functions of any one element may be carried out in various ways in alternative embodiments. Also, the functions of several elements may, in alternative embodiments, be carried out by fewer, or a single, element.

The invention claimed is:
1. An electromagnetic actuator, comprising:
  a ferromagnetic armature including a distal part and a proximal part; said distal part of the armature being cooperatively arranged with a pliable member;
  a solenoid coil and an armature housing constructed and arranged to receive in an armature chamber said armature movable within said armature housing between an extended position and a retracted position, wherein said distal part of the armature is arranged to compress said pliable member against a valve seat when closing a valve passage while said armature is disposed in said extended position;

a fluid passage included in said ferromagnetic armature and constructed to enable force-balancing fluid displaced between said proximal part and said distal part by movement of said ferromagnetic armature;

a control circuit constructed to apply a coil drive current to said solenoid coil and thereby cause a linear displacement of said armature respect to a valve passage controlled by said actuator, orientation of said coil drive determining movement of said linear displacement of said movable armature toward an open position of said valve passage or a closed position of said valve passage; and a radial magnet arranged to provide two magnetic flux paths extending together over a length of said armature and designed to maintain said armature stationary in both said open position and said closed position by a force of a magnetic field without application of said coil drive current.

2. The actuator of claim 1 wherein said fluid passage includes a slot extending along the entire length of said ferromagnetic armature.

3. The actuator of claim 2 further including an armature sensor constructed to detect displacement of said armature.

4. The actuator of claim 3 wherein said armature sensor includes a coil sensor.

5. The actuator of claim 3 wherein said armature sensor is constructed to provide signals to said control circuit in a feedback arrangement.

6. The actuator of claim 5 wherein said feedback arrangement includes a differentiator.

7. The actuator of claim 5 wherein said feedback arrangement includes a signal conditioner comprising a preamplifier and a low-pass filter.

8. The actuator of claim 1 wherein said control circuit is powered by a battery.

9. The actuator of claim 1 wherein said radial magnet includes a single ring-like member.

10. The actuator of claim 1 wherein said radial magnet includes two or more semicircular members.

11. The actuator of claim 1 wherein said radial magnet includes several discrete magnets located radially with respect to said ferromagnetic armature.

12. The actuator of claim 1 wherein said control circuit is operatively connected to receive signals from an external object sensor.

13. The actuator of claim 1 wherein said control circuit is operatively connected to receive signals from an external object sensor.

14. An electromagnetic actuator, comprising:

a solenoid coil and an armature housing constructed and arranged to form an armature chamber;

a ferromagnetic armature including a proximal part and a distal part linearly movable inside said armature chamber;

said ferromagnetic armature including a shoulder constructed to provide a magnetic flux path;

a radial magnet disposed in a fixed arrangement with respect to said armature housing, said radial magnet having its poles oriented perpendicularly to a direction of said linearly movable ferromagnetic armature;

a control circuit constructed to apply a coil drive current to said solenoid coil and thereby cause a linear displacement of said distal part of said ferromagnetic armature with respect to a valve passage controlled by said actuator;

a pole piece disposed in a fixed arrangement with respect to said armature housing and located near said proximal part of said linearly movable ferromagnetic armature; and said radial magnet located with respect to said shoulder and said armature housing being constructed to provide two magnetic flux paths extending from said proximal part to said distal part, and said armature, said shoulder, said armature housing and said pole piece being constructed and assembled to provide a magnetic flux path between the poles of said radial magnet to maintain said armature in a stationary position, when in said retracted state or said extended state, by a force of a magnetic field without application of said coil drive current.

15. The actuator of claim 14 wherein said radial magnet includes a single ring-like member.

16. The actuator of claim 14 wherein said radial magnet includes two or more semicircular members.

17. The actuator of claim 14 wherein said radial magnet includes several discrete magnets located radially with respect to said ferromagnetic armature.

18. The actuator of claim 14, wherein said control circuit is operatively connected to an external object sensor.

19. The actuator of claim 18 wherein said object sensor includes a motion sensor.

20. The actuator of claim 18 wherein said object sensor includes a presence sensor.

21. The actuator of claim 18 wherein said ferromagnetic armature includes a fluid passage constructed to enable force-balancing fluid displaced between said proximal part and said distal part by movement of said ferromagnetic armature.

22. The actuator of claim 14 wherein said pole piece is constructed to alter a gap to said proximal part of said ferromagnetic armature.

23. The actuator of claim 22 wherein said armature sensor is constructed to provide signals to said control circuit in a feedback arrangement.

24. The actuator of claim 22 wherein said control circuit is constructed to apply said coil drive current to said coil in response to an output from said armature sensor.

25. The actuator of claim 24 wherein said control circuit is constructed to apply said coil drive to said coil in a first direction to displace said armature to a first end position and being responsive to an output from said armature sensor meeting a predetermined first current-termination criterion to stop applying coil drive to the coil in the first drive direction.

26. The actuator of claim 25 wherein said control circuit is constructed to apply said coil drive to said coil in a second direction, being opposite to said first direction, and thereby tend to drive the armature to a second end position; said sensor is so coupled to the actuator as to sense said armature reaching the second end position; and said control circuit is operable to begin applying coil drive to the coil in the second drive direction and responsive to said sensor output meeting a predetermined second current-termination criterion to stop applying coil drive to said coil in the second drive direction.

27. The actuator of claim 22 wherein said armature sensor includes a coil sensor.

28. The actuator of claim 22 wherein said armature sensor is constructed to provide signals to said control circuit in a feedback arrangement.

29. The actuator of claim 28 wherein said feedback arrangement includes a differentiator.

30. The actuator of claim 28 wherein said feedback arrangement includes a signal conditioner comprising a preamplifier and a low-pass filter.

31. The actuator of claim 14 wherein said object sensor includes a passive optical sensor.

32. The actuator of claim 14 further including an armature sensor constructed to detect displacement of said armature.

33. An electromagnetic actuator, comprising:
a solenoid coil and an armature housing constructed and arranged to form an armature chamber;
a ferromagnetic armature including a proximal part and a distal part linearly movable inside said armature chamber;
said ferromagnetic armature including a shoulder constructed to provide a magnetic flux path;
a radial magnet disposed in a fixed arrangement with respect to said armature housing;
a control circuit constructed to apply a coil drive current to said solenoid coil and thereby cause a linear displacement of said distal part of said ferromagnetic armature with respect to a valve passage controlled by said actuator;
a pole piece disposed in a fixed arrangement with respect to said armature housing and located near said proximal part of said ferromagnetic armature;
said radial magnet located with respect to said shoulder and said armature housing being constructed to provide two magnetic flux paths extending from said distal part to said proximal part and said pole piece, and said armature, said shoulder, said armature housing and said pole piece being constructed and assembled to provide a magnetic flux path between the poles of said radial magnet to maintain said armature in a stationary position, when in said retracted state or said extended state, by a force of a magnetic field without application of said coil drive current; and
a cavity disposed inside said ferromagnetic armature constructed to receive a bias spring positioned and arranged to bias said armature toward its extended state.

34. The actuator of claim 33 wherein said radial magnet includes a single ring-like member.

35. The actuator of claim 33 wherein said radial magnet includes two or more semicircular members.

36. The actuator of claim 33 wherein said radial magnet includes several discrete magnets located radially with respect to said ferromagnetic armature.

* * * * *